(12) United States Patent
Pang et al.

(10) Patent No.: US 12,224,926 B2
(45) Date of Patent: Feb. 11, 2025

(54) ROUTE PROCESSING METHOD AND NETWORK DEVICE

(71) Applicant: Huawei Technologies Co., Ltd., Shenzhen (CN)

(72) Inventors: Donglei Pang, Beijing (CN); Haibo Wang, Beijing (CN); Gang Yan, Beijing (CN); Xingjian He, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/463,727

(22) Filed: Sep. 8, 2023

(65) Prior Publication Data

US 2023/0421480 A1    Dec. 28, 2023

Related U.S. Application Data

(63) Continuation of application No. PCT/CN2022/070018, filed on Jan. 4, 2022.

(30) Foreign Application Priority Data

Mar. 8, 2021 (CN) .......................... 202110251898.X

(51) Int. Cl.
 *G06F 15/173* (2006.01)
 *H04L 45/00* (2022.01)
 *H04L 45/02* (2022.01)
 *H04L 45/036* (2022.01)

(52) U.S. Cl.
 CPC ............ *H04L 45/036* (2022.05); *H04L 45/04* (2013.01); *H04L 45/38* (2013.01)

(58) Field of Classification Search
 CPC ................................ H04L 45/04; H04L 45/38
 See application file for complete search history.

(56) References Cited

U.S. PATENT DOCUMENTS

| 2020/0366607 A1* | 11/2020 | Kommula ............... H04L 45/20 |
| 2021/0083940 A1 | 3/2021 | Peng et al. |

FOREIGN PATENT DOCUMENTS

| CN | 110401972 A | 11/2019 |
| CN | 110944357 A | 3/2020 |
| JP | 2018164235 A | 10/2018 |

* cited by examiner

*Primary Examiner* — Joseph R Maniwang
(74) *Attorney, Agent, or Firm* — Conley Rose, P.C.

(57) ABSTRACT

In a route processing method, a first network device obtains one or more routes having a same destination address, and including a first route. Slice information corresponding to the one or more ports is determined based on one or more ports that are on the first network device and that receive the one or more routes. The first network device sends an updated first route to a second network device, where the updated first route carries the slice information and the destination address. After a route is received, corresponding slice information is determined based on a port that receives the route, so that slice information supported by a path from a network device to a route starting device is determined. The determined slice information is carried when the route is forwarded, so that a network device on a route advertisement path can obtain the slice information supported by the entire path.

20 Claims, 10 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    TYPE (type)    |  LENGTH (length)  | sliceidCNT (slice identifier count) |
+-+-+-+-+-+-+-+-+-+-+-+-+-+-+-+-+-+-+-+-+-+-+-+-+-+-+-+-+-+-+-+-+
|                    sliceid-1 Value (slice identifier)                       |
+-+-+-+-+-+-+-+-+-+-+-+-+-+-+-+-+-+-+-+-+-+-+-+-+-+-+-+-+-+-+-+-+
```

ROUTE PROCESSING METHOD AND NETWORK DEVICE

CROSS-REFERENCE TO RELATED APPLICATIONS

This application is a continuation of International Patent Application No. PCT/CN2022/070018 filed on Jan. 4, 2022, which claims priority to Chinese Patent Application No. 202110251898.X filed on Mar. 8, 2021. The disclosures of the aforementioned applications are hereby incorporated by reference in their entireties.

TECHNICAL FIELD

The present disclosure relates to the field of communications technologies, and in particular, to a route processing method and a network device.

BACKGROUND

With the development of communications technologies, a network slicing technology has become an important network technology, and is applied to planning and deployment of many networks. The network slicing technology can provide a rigid isolation service for an end-to-end service and quality assurance for various service-level agreements (SLAs), such as latency, link costs, and bandwidth.

In a current network, a Flexible Ethernet (FlexE) interface is disposed on a network device to be associated with a network slice identifier, to implement network slice division. In addition, an interior gateway protocol (IGP) running between network devices on the network supports path computation by using the FlexEth interface as an outbound interface of a route. Therefore, when the network device needs to search an IGP route to forward a service traffic packet, the network device may match, based on a network slice identifier that is carried by the service traffic packet, the network slice identifier associated with the FlexEth interface to select the FlexEth interface for forwarding.

However, when performing path computation based on the IGP, the network device does not use slice information associated with the FlexEth interface as path computation information to compute a path. Therefore, for a specific path that is obtained through computation, a fragmentation capability of an outbound interface of a node that the path passes through cannot be known. In other words, the IGP running in the current network cannot ensure that fragmentation capabilities supported by nodes on the path that is obtained through computation all meet a requirement of the service traffic packet.

SUMMARY

Embodiments of the present disclosure provide a route processing method and a network device. After receiving a route, the network device determines corresponding slice information based on a port that receives the route, to determine slice information supported by a path from the network device to a route starting device. In addition, the network device carries the determined slice information when forwarding the route, so that a network device on a route advertisement path can obtain the slice information supported by the entire path. In this way, when computing a forwarding path of a packet, the network device can obtain, through computation and based on the slice information supported by the path, a path that meets a packet service requirement, to ensure on-demand forwarding of the packet.

A first aspect of the present disclosure provides a route processing method. The method includes: A first network device obtains one or more routes, where the one or more routes have a same destination address, and the one or more routes include a first route. The first network device may obtain the one or more routes by receiving routes sent by one or more neighboring devices. The one or more routes have a same destination address. In other words, the one or more routes have a same route originator. Based on one or more ports that are on the first network device and that receive the one or more routes, the first network device determines slice information corresponding to the one or more ports. The slice information corresponding to the one or more ports may be slice information supported by a path from the first network device to the destination address in the route received by the one or more ports. The first network device sends an updated first route to a second network device, where the first route carries the slice information and the destination address. After the first network device determines the slice information corresponding to the one or more ports, the first network device may update the first route based on the slice information corresponding to the one or more ports to obtain the updated first route, and the updated first route carries the slice information corresponding to the one or more ports and the destination address.

In this solution, after receiving a route, the network device determines corresponding slice information based on a port that receives the route, to determine slice information supported by a path from the network device to a route starting device. In addition, the network device carries the determined slice information when forwarding the route, so that a network device on a route advertisement path can obtain the slice information supported by the entire path. In this way, when computing a forwarding path of a packet, the network device can obtain, through computation and based on the slice information supported by the path, a path that meets a packet service requirement and ensure that all fragmentation capabilities supported by nodes on the path meet a service traffic packet requirement.

In a possible implementation, the determining, based on one or more ports that are on the first network device and that receive the one or more routes, slice information corresponding to the one or more ports includes: obtaining slice information respectively supported by the one or more ports that are on the first network device and that receive the one or more routes; and determining, based on the slice information respectively supported by the one or more ports, the slice information corresponding to the one or more ports.

For example, the one or more ports may be ports that support configuration of the slice information, such as FlexEth interfaces or channelized sub-interfaces. The one or more ports can be configured to support specific slice information. The first network device may determine, based on the slice information respectively supported by the one or more ports, the slice information corresponding to the one or more ports, to determine the slice information supported by the path from the network device to the rout starting device.

In a possible implementation, the one or more routes all carry the slice information, and the determining, based on the slice information respectively supported by the one or more ports, the slice information corresponding to the one or more ports includes: determining, based on slice information carried by the one or more routes and the slice information respectively supported by the one or more ports, the slice information corresponding to the one or more ports, where there is a correspondence between the slice information corresponding to the one or more ports and the destination address of the one or more routes.

In other words, the first network device may determine, based on both the slice information carried by the one or more routes and the slice information respectively supported by the one or more ports, the slice information corresponding to the one or more ports.

In a possible implementation, the determining, based on slice information carried by the one or more routes and the slice information respectively supported by the one or more ports, the slice information corresponding to the one or more ports includes: determining, based on slice information carried by each of the one or more routes and slice information supported by a port corresponding to each route, slice information corresponding to each of the one or more ports; and determining, based on the slice information corresponding to each of the one or more ports, the slice information corresponding to the one or more ports, where the slice information corresponding to the one or more ports includes the slice information corresponding to each port.

Simply, the first network device may determine, based on slice information supported by each port and slice information in a route received by each port, the slice information corresponding to each port, and then determine slice information corresponding to a plurality of ports by calculating a union set of slice information corresponding to each of the plurality of ports. In this way, it can be ensured that the slice information corresponding to the plurality of ports is the slice information supported by the path from the first network device to the routing starting device from the network device.

In a possible implementation, the determining, based on slice information carried by each of the one or more routes and slice information supported by a port corresponding to each route, slice information corresponding to each of the one or more ports includes: obtaining first slice information and second slice information, where the first slice information is slice information carried by any one of the one or more routes, and the second slice information is slice information supported by a first port corresponding to a route that carries the first slice information; and determining that same slice information in the first slice information and the second slice information is third slice information, where the third slice information is slice information corresponding to the first port.

For example, it is assumed that slice information carried by a route is a slice identifier 1, a slice identifier 2, and a slice identifier 3 (that is, the first slice information), and slice information supported by a port that receives the route is the slice identifier 1 and the slice identifier 3 (that is, the second slice information). In this case, slice information corresponding to the port may be determined as the slice identifier 1 and the slice identifier 3 (that is, the third slice information).

In a possible implementation, none of the one or more routes carries slice information, and the determining, based on the slice information respectively supported by the one or more ports, the slice information corresponding to the one or more ports includes: determining, based on slice information supported by each of the one or more ports, the slice information corresponding to the one or more ports, where the slice information corresponding to the one or more ports includes the slice information supported by each port.

In a possible implementation, the method further includes: The first network device receives a second route, where the second route includes fourth slice information; the first network device obtains slice information supported by a port that receives the second route; and the first network device determines, based on that there is no same slice information between the fourth slice information and the slice information supported by the port that receives the second route, not to forward the second route.

In other words, when slice information carried by a route received by the network device does not intersect with slice information supported by a port that receives the route, the network device determines not to forward the route and does not generate a forwarding entry corresponding to the route, to avoid that a packet service requirement cannot be met in a subsequent packet forwarding process because a forwarding port does not support specific slice information.

In a possible implementation, the method further includes: The first network device receives a first packet, where the first packet includes fifth slice information; the first network device searches a forwarding table based on a destination address in the first packet, to obtain at least one port corresponding to the first packet; and the first network device determines, based on the fifth slice information from the at least one port, a port for forwarding the first packet, where slice information supported by the port for forwarding the first packet includes slice information in the packet.

In other words, in a packet forwarding process, when the network device obtains one or more matched outbound interfaces by searching the forwarding entry, the network device may select, based on slice information carried by a packet, an outbound interface that has corresponding slice information.

In a possible implementation, the first network device receives one or more Border Gateway Protocol (BGP) messages. Each of the one or more BGP messages includes one of the one or more routes, and an extended community attribute of each BGP message includes slice information of one of the one or more routes. The extended community attribute in the one or more BGP messages includes the slice information.

For example, when a network device 2 sends a route 2 to a network device 3 by using a BGP message, the BGP message sent by the network device 2 may include one or more routes. The one or more routes are routes advertised by the network device 2 to the network device 3, and the one or more routes include the foregoing route 2. The BGP message further includes an extended community attribute corresponding to the route 2, and the extended community attribute carries slice information of the route 2, in other words, slice information corresponding to a port 1 in the foregoing network device 2.

In a possible implementation, the first network device is a network device in a campus network, a data center network, or a software-defined wide area network (SD-WAN).

A second aspect of the present disclosure provides a network device. The network device is separately connected to a plurality of network devices. The network device includes a transceiver unit and a processing unit. The transceiver unit is configured to obtain one or more routes. The one or more routes have a same destination address, and the one or more routes include a first route. The processing unit is configured to determine, based on one or more ports that are on the first network device and that receive the one or more routes, slice information corresponding to the one or more ports. The transceiver unit is further configured to send an updated first route to a second network device, where the updated first route carries the slice information and the destination address.

In a possible implementation, the processing unit is further configured to: obtain slice information respectively supported by the one or more ports that are on the first network device and that receive the one or more routes, and determine, based on the slice information respectively supported by the one or more ports, the slice information corresponding to the one or more ports.

In a possible implementation, the one or more routes all carry the slice information. The processing unit is further configured to determine, based on slice information carried by the one or more routes and the slice information respectively supported by the one or more ports, the slice information corresponding to the one or more ports, where there is a correspondence between the slice information corresponding to the one or more ports and the destination address of the one or more routes.

In a possible implementation, the processing unit is further configured to: determine, based on slice information carried by each of the one or more routes and slice information supported by a port corresponding to each route, slice information corresponding to each of the one or more ports, and determine, based on the slice information corresponding to each of the one or more ports, the slice information corresponding to the one or more ports, where the slice information corresponding to the one or more ports includes the slice information corresponding to each port.

In a possible implementation, the processing unit is further configured to: obtain first slice information and second slice information, where the first slice information is slice information carried by any one of the one or more routes, and the second slice information is slice information supported by a first port corresponding to a route that carries the first slice information; and determine that same slice information in the first slice information and the second slice information is third slice information, where the third slice information is slice information corresponding to the first port.

In a possible implementation, none of the one or more routes carries slice information. The processing unit is further configured to determine, based on slice information supported by each of the one or more ports, the slice information corresponding to the one or more ports, where the slice information corresponding to the one or more ports includes the slice information supported by each port.

In a possible implementation, the transceiver unit is further configured to receive a second route, where the second route includes fourth slice information. The processing unit is further configured to obtain slice information supported by a port that receives the second route. The first network device determines, based on that there is no same slice information between the fourth slice information and the slice information supported by the port that receives the second route, not to forward the second route.

In a possible implementation, the transceiver unit is further configured to receive a first packet, where the first packet includes fifth slice information. The processing unit is further configured to: search a forwarding table based on a destination address in the first packet, to obtain at least one port corresponding to the first packet; and determine, based on the fifth slice information from the at least one port, a port for forwarding the first packet, where slice information supported by the port for forwarding the first packet includes slice information in the packet.

In a possible implementation, the first network device receives one or more border gateway protocol BGP messages. Each of the one or more BGP messages includes one of the one or more routes, and an extended community attribute of each BGP message includes slice information of one of the one or more routes.

In a possible implementation, the first network device is a network device in a campus network, a data center network, or a software-defined wide area network.

A third aspect of the present disclosure provides a network device. The network device includes one or more processors configured to enable the network device to implement the method according to any possible implementation of the first aspect. The device may further include a memory. The memory is coupled to the one or more processors. When the one or more processors executes instructions stored in the memory, the network device may be enabled to implement the method according to any possible implementation of the first aspect. The device may further include a communication interface. The communication interface is used by the apparatus to communicate with another device. For example, the communication interface may be a transceiver, a circuit, a bus, a module, or another type of communication interface.

In the present disclosure, the instructions in the memory may be stored in advance, or may be stored after being downloaded from the internet when the network device is used. A source of the instructions in the memory is not specifically limited in the present disclosure. The coupling in the present disclosure is an indirect coupling or a connection between apparatuses, units, or modules, may be in an electrical form, a mechanical form, or another form, and is used for information exchange between the apparatuses, the units, or the modules.

A fourth aspect of the present disclosure provides a network system. The network system includes a plurality of network devices. The plurality of network devices includes the network device according to the third aspect. When the network device obtains a route, the network device can implement the method according to any possible implementation of the first aspect.

A fifth aspect of the present disclosure provides a computer storage medium. The computer storage medium may be non-volatile. The computer storage medium stores computer-readable instructions. When the computer-readable instructions are executed by a processor, the method according to any possible implementation of the first aspect is implemented.

A sixth aspect of the present disclosure provides a computer program product including instructions. When the computer program product runs on a computer, the computer is enabled to perform the method according to any possible implementation of the first aspect.

The solutions provided in the second aspect to the sixth aspect are used to implement or cooperate to implement the method provided in the first aspect, and therefore, can achieve beneficial effects the same as or corresponding to those in the first aspect. Details are not described herein again.

DESCRIPTION OF EMBODIMENTS

Figure 1:
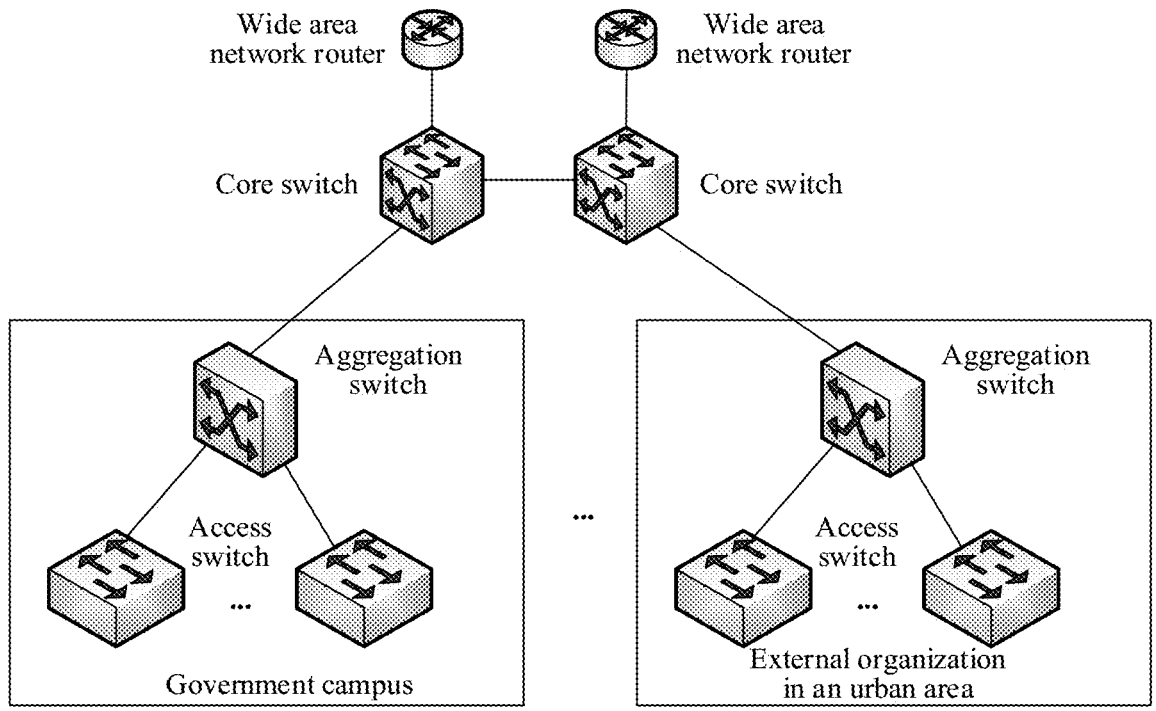
FIG. 1 is a schematic diagram of a structure of a government campus network according to an embodiment of the present disclosure.

To make objectives, technical solutions, and advantages of the present disclosure clearer, the following describes embodiments of the present disclosure with reference to accompanying drawings. It is clear that the described embodiments are merely some but not all of embodiments of the present disclosure. A person of ordinary skill in the art may learn that, as a new application scenario emerges, the technical solutions provided in embodiments of the present disclosure are also applicable to a similar technical problem.

In the specification, the claims, and the accompanying drawings of the present disclosure, the terms "first", "second", and the like are intended to distinguish between similar objects but do not necessarily indicate a specific order or sequence. It should be understood that data termed in such a way are interchangeable in proper circumstances so that embodiments of the present disclosure described herein can be implemented in other orders than the order illustrated or described herein. In addition, the terms "include", "have" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in the present disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Unit division in the present disclosure is logical division and may be other division during actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in the present disclosure. In addition, units or subunits described as separate parts may or may not be physically separate, may or may not be physical units, or may be distributed into a plurality of circuit units. Some or all of the units may be selected according to actual requirements to achieve the objectives of the solutions of the present disclosure.

With the development of communications technologies, a network slicing technology has become an important network technology, and is applied to planning and deployment of many networks. The network slicing technology can provide a rigid isolation service for an end-to-end service and quality assurance for various SLAs, such as latency, link cost, and bandwidth.

For details, refer to FIG. 1. FIG. 1 is a schematic diagram of a structure of a government campus network according to an embodiment of the present disclosure. As shown in FIG. 1, the government campus network is used as an example. The government campus network is deployed in a typical campus network hierarchical manner, and includes an access layer, an aggregation layer, and a core layer. On the government campus network, access users have diversified units and users. This results in different access services. Different access services have diversified network requirements, such as high bandwidth, low latency, high reliability, or high security. In a network planning and deployment process, a network slice can provide differentiated network services to meet different network requirements.

In a current network, a FlexEth interface is disposed on a network device to associate with an identifier of a network slice, to implement network slice division. In addition, an IGP running between network devices on the network supports path computation by using the FlexEth interface as an outbound interface of a route. Therefore, when the network device needs to search an IGP route to forward a service traffic packet, the network device may match, based on a network slice identifier that is carried by the service traffic packet, a network slice identifier associated with the FlexEth interface to select the FlexEth interface for forwarding.

However, when performing path computation based on the IGP, the network device does not use slice information associated with the FlexEth interface as path computation information to compute a path. Therefore, for a specific path that is obtained through computation, a fragmentation capability of an outbound interface of a node that the path passes through cannot be known. In other words, the IGP running in the current network cannot ensure that fragmentation capabilities supported by nodes on the path that is obtained through computation all meet a requirement of the service traffic packet.

In view of this, an embodiment of the present disclosure provides a route processing method. After receiving a route, a network device determines corresponding slice information based on a port that receives the route, to determine slice information supported by a path from the network device to a route starting device. In addition, the network device carries the determined slice information when forwarding the route, so that a network device on a route advertisement path can obtain the slice information supported by the entire path.

For ease of understanding, the following uses an example in which a route processing method according to an embodiment of the present disclosure is applied to a campus network for description. However, the route processing method is not limited to being applied to a campus network. The route processing method is also applicable to networking scenarios such as a software-defined wide area network (SD-WAN) and a data center network.

A network device in embodiments described below may be, for example, a physical device such as a router, a switch, or a gateway, or may be a virtual device that supports routing and packet forwarding. A specific type of the network device described below is not limited in embodiments.

Figure 2:
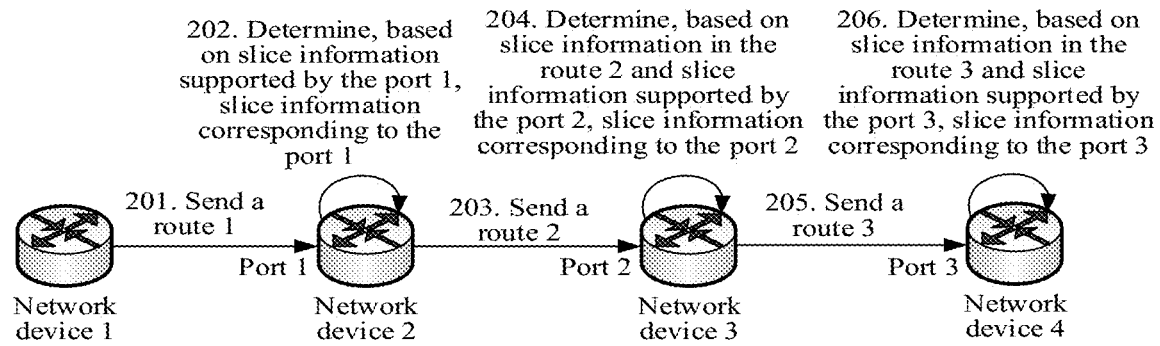
FIG. 2 is a schematic flowchart of a route processing method according to an embodiment of the present disclosure.

FIG. 2 is a schematic flowchart of a route processing method according to an embodiment of the present disclosure. As shown in FIG. 2, the route processing method includes the following steps 201 to 206.

Step 201: A network device 1 sends a route 1 to a network device 2.

In this embodiment, a network system in FIG. 2 includes the network device 1 to a network device 4 that are sequentially connected. Optionally, in the network device 1 to the network device 4, a BGP connection is established between two adjacent network devices. In this way, any network device may send a route to another adjacent network device through the BGP connection.

In addition, two adjacent network devices in the network device 1 to the network device 4 may alternatively establish a connection according to another protocol, so that a route can be sent between the two adjacent network devices. This embodiment does not limit a protocol for establishing a connection between network devices.

The network device 1 serves as a route originator, and sends the route 1 to the network device 2. A destination address of the route 1 is an address of the network device 1, for example, a loopback address of the network device 1. The route 1 does not carry slice information. In this embodiment, the slice information is related information that indicates a network slice. For example, the slice information may include at least one of an identifier (ID) of a network slice, a service type of the network slice service, a slice type of the network slice service, and an ID of the slice type. That is, as long as a specific slice service can be indicated, a specific identification manner in the slice information is not uniquely limited in this embodiment.

Step 202: The network device 2 determines, based on slice information supported by a port 1, slice information corresponding to the port 1, where the port 1 is a port through which the network device 2 receives the route 1.

When the network device 1 sends the route 1 to the network device 2, the network device 2 receives the route 1 through the port 1. Because the route 1 sent by the network device 1 does not carry the slice information, the network device 2 may determine that the network device 1 is the route originator of the route 1, and the network device 1 may determine, based on the slice information supported by the port 1, the slice information corresponding to the port 1. The slice information corresponding to the port 1 is slice information supported by a corresponding path from the port 1 to the destination address in the route 1. It may be understood that, because the corresponding path from the port 1 to the destination address in the route 1 is a link between the port 1 and a port through which the network device 1 sends the route 1, the slice information supported by the corresponding path from the port 1 to the destination address in the route 1 is actually the slice information supported by the port 1. In this way, the network device 2 may determine, based on the slice information supported by the port 1, the slice information corresponding to the port 1.

For example, it is assumed that the slice information supported by the port 1 is specifically an identifier of a network slice 1 (hereinafter referred to as a slice identifier 1), a slice identifier 2, and a slice identifier 3. In this case, the network device 2 may determine that the slice information corresponding to the port 1 is the slice information 1, the slice identifier 2, and the slice identifier 3. It should be understood that, for ease of description, in embodiments, a slice identifier x may be an identifier of a network slice x.

In this embodiment, the network device 2 may obtain, through next-hop iteration, the port 1 that determines to receive the route 1. Specifically, when the network device 1 sends the route 1, the network device 1 adds a next-hop address to the route 1. The next-hop address is an address of a port that is on the network device 1 and that is for sending the route 1. The port that is on the network device 1 and that is for sending the route 1 is a port that is on the network device 1 and that is connected to the port on the network device 2. The network device 2 stores a routing table, and the routing table records a correspondence between an address of a neighboring device of the network device 2 and a port address of the network device 2. In this way, the network device 2 may determine, by querying the routing table based on the next-hop address in the route 1, that a port receiving the route 1 is the port 1 corresponding to the next-hop address.

Simply, for any network device, when the network device receives a route that does not carry slice information, the network device may determine, based on slice information supported by a port that receives the route, slice information corresponding to the port.

The port 1 on the network device 2 may be a port that supports configuration of slice information. In other words, the port 1 can be configured to support specific slice information. When a packet is sent through the port 1, a service requirement corresponding to the slice information supported by the port 1 can be met. For example, the port 1 may be an interface, for example, a FlexEth interface or a channelized sub-interface.

Specifically, in a network planning process, a FlexEth interface may be configured for a physical interface based on a service capability supported by the network, so that a physical interface can support slice information. Then, a bandwidth resource is configured on the FlexEth interface, and slice information corresponding to the bandwidth resource is configured on the FlexEth interface, to obtain slice information supported by the FlexEth interface through configuration. A process of performing slice information configuration on the FlexEth interface may be implemented automatically through a controller, or may be completed by an operation and maintenance engineer through manual configuration. This is not specifically limited in this embodiment.

It should be understood that, in addition to the port 1, all other ports mentioned in this embodiment may be ports that support configuration of slice information, for example, ports such as a port 2 and a port 3 in FIG. 2. Details are not described in this embodiment again.

Step 203: The network device 2 sends a route 2 to the network device 3, where the route 2 carries the slice information corresponding to the port 1.

After determining the slice information corresponding to the port 1, the network device 2 may update the route 1 based on the slice information corresponding to the port 1, to obtain the route 2. A destination address in the route 2 is the same as the destination address of the route 1. In other words, the destination address of the route 2 is still the address of the network device 1, and the route 2 carries the slice information corresponding to the port 1.

In a possible embodiment, when the network device 2 advertises a route by using a BGP message, the slice information corresponding to the port 1 may be carried by an extended community attribute.

For example, when the network device 2 sends the route 2 to the network device 3 by using the BGP message, the BGP message sent by the network device 2 may include one or more routes. The one or more routes are routes advertised by the network device 2 to the network device 3, and the one or more routes include the foregoing route 2. The BGP message further includes an extended community attribute corresponding to the route 2, and the extended community attribute carries slice information of the route 2, in other words, the slice information corresponding to the port 1.

Figures 3, 4A:
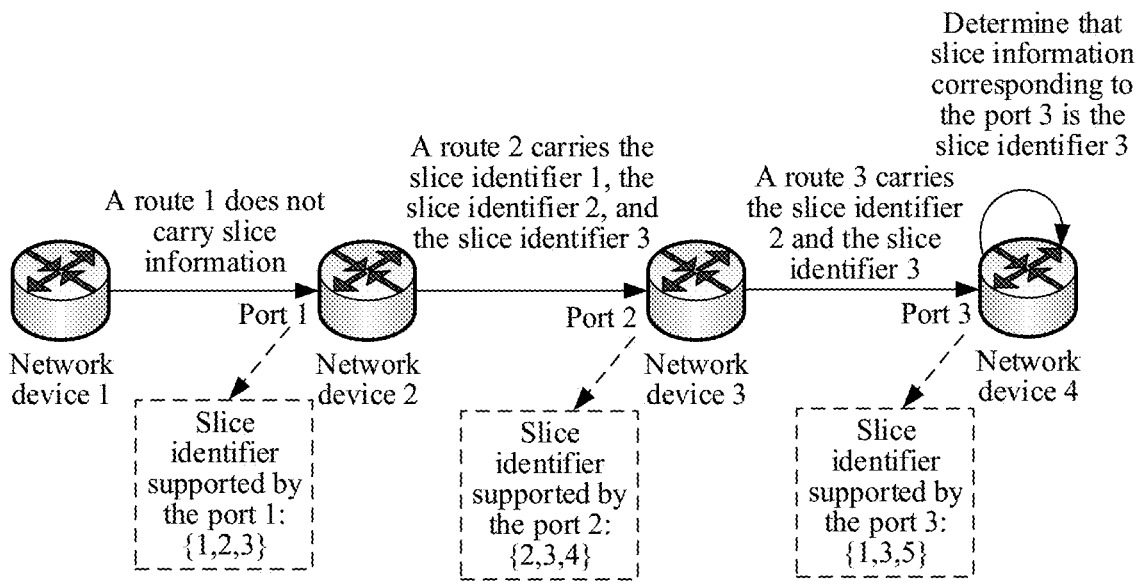
FIG. 3 is a schematic diagram of a format of an extended community attribute according to an embodiment of the present disclosure.
FIG. 4A is a schematic flowchart of route sending according to an embodiment of the present disclosure.

In a possible example, refer to FIG. 3. FIG. 3 is a schematic diagram of a format of an extended community attribute according to an embodiment of the present disclosure. As shown in FIG. 3, the extended community attribute includes a type field, a length field, a slice identifier count (sliceidCNT) field, and a slice identifier (slice id Value) field. The type field indicates a type of content carried by the extended community attribute. It may be determined, based on the type field, that the extended community attribute carries slice information. The length field indicates a data length of the extended community attribute. The slice identifier count field indicates a quantity of slice identifiers carried by the extended community attribute. For example, a value of a slice identifier count field in the extended community attribute corresponding to the route 2 is 3, that is, indicates that a quantity of slice identifiers is 3. The slice identifier field indicates a specific slice identifier, for example, the slice identifier 1, the slice identifier 2, and the slice identifier 3.

After updating the route 1 and obtaining the route 2, the network device 2 continues to advertise the route to another neighboring device of the network device 2, that is, the network device 2 sends the route 2 to the neighboring device of the network device 2, namely, the network device 3.

Step 204: The network device 3 determines, based on slice information in the route 2 and the slice information supported by the port 1, slice information corresponding to the port 2, where the port 2 is a port through which the network device 3 receives the route 2.

When the network device 2 sends the route 2 to the network device 3, the network device 3 receives the route 2 through the port 2. The slice information corresponding to the port 2 is slice information supported by a corresponding path from the port 2 to the destination address in the route 2. A corresponding path from the port 2 to the destination address in the route 2 is a link between the port 2 and a port that is of the network device 2 and that sends the route 2 (that is, a link between the network device 3 and the network device 2) and a link between the network device 2 and the network device 1. Therefore, the slice information supported by the corresponding path from the port 2 to the destination address in the route 2 is actually slice information supported by both the link between the network device 3 and the network device 2 and the link between the network device 2 and the network device 1.

Because the slice information carried by the route 2 is slice information supported by the link between the network device 2 and the network device 1, the network device 2 may determine, based on slice information supported by the port 2 and the slice information in the route 2, the slice information supported by the corresponding path from the port 2 to the destination address in the route 2, to determine the slice information corresponding to the port 2.

Simply, when a network device receives a route that carries slice information, the network device may determine, based on both the slice information carried by the route and slice information supported by a port that receives the route, slice information corresponding to the port.

For example, it is assumed that the slice information supported by the port 2 is specifically the slice identifier 2, the slice identifier 3, and a slice identifier 4, and the slice information in the route 2 is specifically the slice identifier 1, the slice identifier 2, and the slice identifier 3. In this case, the network device 3 may determine that the slice information corresponding to the port 2 is slice information that is included in both the slice information supported by the port 2 and the slice information in the route 2, to be specific, the slice identifier 2 and the slice identifier 3.

Step 205: The network device 3 sends a route 3 to the network device 4, where the route 3 carries the slice information corresponding to the port 2.

After determining the slice information corresponding to the port 2, the network device 3 may update the route 2 based on the slice information corresponding to the port 2, to obtain the route 3. A destination address in the route 3 is the same as the destination address of the route 2. In other words, the destination address of the route 3 is still the address of the network device 1, and the route 3 carries the slice information corresponding to the port 2.

Specifically, a manner of carrying the slice information in the route 3 may be similar to a manner of carrying the slice information in the route 2. For details, refer to the descriptions of step 203. Details are not described herein again.

Step 206: The network device 4 determines, based on the slice information in the route 3 and slice information supported by the port 3, slice information corresponding to the port 3, where the port 3 is a port through which the network device 4 receives the route 3.

When the network device 3 sends the route 3 to the network device 4, the network device 4 receives the route 3 through the port 3. The slice information corresponding to the port 3 is slice information supported by a corresponding path from the port 3 to the destination address in the route 3.

Similarly, because the route 3 carries the slice information, the network device 4 may determine, based on the slice information in the route 3 and the slice information supported by the port 3, the slice information corresponding to the port 3.

For example, it is assumed that the slice information supported by the port 3 is specifically the slice identifier 1, the slice identifier 3, and a slice identifier 5, and the slice information in the route 3 is specifically the slice identifier 2 and the slice identifier 3. In this case, the network device 4 may determine that the slice information corresponding to the port 3 is slice information that is included in both the slice information supported by the port 2 and the slice information in the route 2, to be specific, the slice identifier 3.

In this embodiment, after receiving a route, a network device determines, based on a port that receives the route, slice information corresponding to the port, to determine slice information supported by a path from the network device to a route starting device. In addition, the network device carries the determined slice information when forwarding the route, so that a network device on a route advertisement path can obtain the slice information supported by the entire path. In this way, when computing a forwarding path of a packet, the network device can obtain, through computation and based on the slice information supported by the path, a path that meets a packet service requirement, to ensure on-demand forwarding of the packet.

In a possible embodiment, after the network device determines the slice information corresponding to the port that receives the route, the network device generates a forwarding entry based on the slice information corresponding to the port, to guide subsequent packet forwarding.

For example, in step 202, after the network device 2 determines, based on the slice information supported by the port 1, the slice information corresponding to the port 1, the network device 2 generates a forwarding entry based on the destination address of the route 1 and the slice information corresponding to the port 1. The forwarding entry includes the destination address of the route 1, the port 1, and the slice information corresponding to the port 1.

Similarly, in step 204, the network device 3 may generate a forwarding entry based on the destination address of the route 2 and the slice information corresponding to the port 2. The forwarding entry includes the destination address of the route 2, the port 2, and the slice information corresponding to the port 2.

In this way, in a packet forwarding process, the network device may first search a routing table based on a destination address of a packet, to obtain one or more ports that can be used to forward the packet. Then, the network device selects, based on slice information carried by the packet and slice information corresponding to the port indicated in the routing table, a matched port to send the packet. This ensures that all forwarding paths of the packet support slice information indicated by the packet.

FIG. 4A is a schematic flowchart of route sending according to an embodiment of the present disclosure. As shown in FIG. 4A, a network device 1 sends a route 1 to a network device 2, and the route 1 does not carry slice information.

The network device 2 receives the route 1 through a port 1, and slice information supported by the port 1 is a slice identifier 1, a slice identifier 2, and a slice identifier 3. The network device 2 determines that slice information corresponding to the port 1 is the slice identifier 1, the slice identifier 2, and the slice identifier 3. The network device 2 obtains a route 2 by updating the route 1, and sends the route 2 to a network device 3. The route 2 carries the slice information corresponding to the port 1, to be specific, the slice identifier 1, the slice identifier 2, and the slice identifier 3.

The network device 3 receives the route 2 through a port 2, and slice information supported by the port 2 is the slice identifier 2, the slice identifier 3, and a slice identifier 4. The network device 3 determines that slice information corresponding to the port 2 is an intersection set of the slice information carried by the route 2 and the slice information supported by the port 2, to be specific, the slice identifier 2 and the slice identifier 3. The network device 3 obtains a route 3 by updating the route 2, and sends the route 3 to a network device 4, where the route 3 carries the slice information corresponding to the port 2.

The network device 4 receives the route 3 through a port 3, and slice information supported by the port 3 is the slice identifier 1, the slice identifier 3, and a slice identifier 5. The network device 4 determines that slice information corresponding to the port 3 is the slice identifier 3.

Figure 4B:
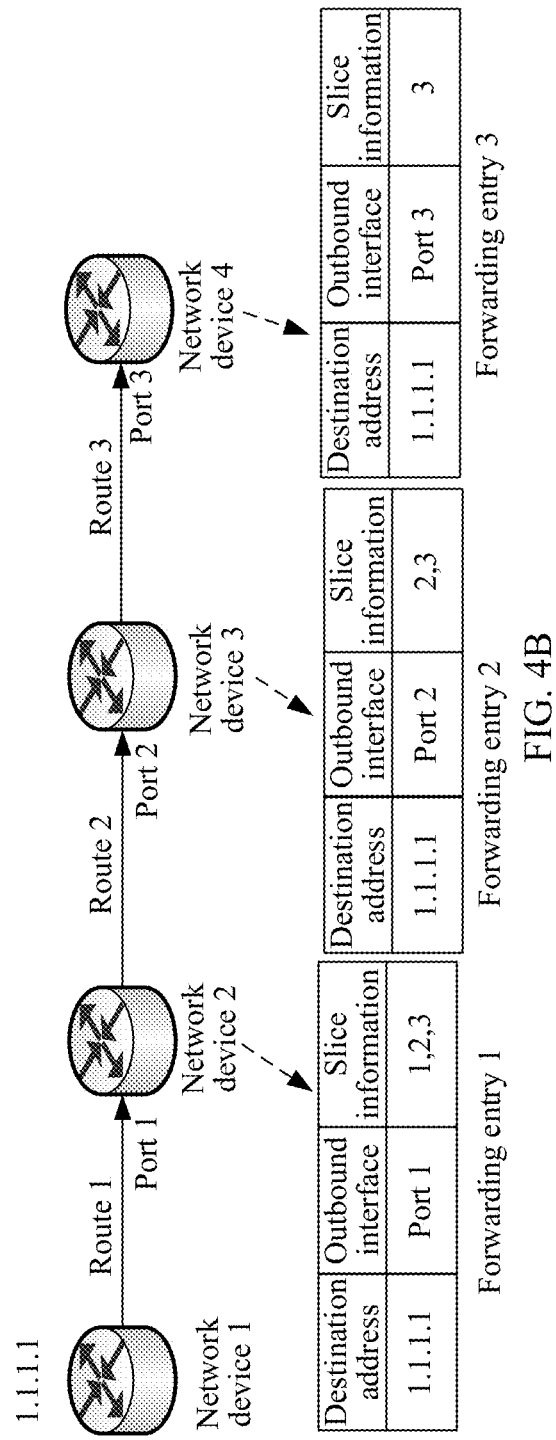
FIG. 4B is a schematic diagram of generating a forwarding entry according to an embodiment of the present disclosure.

FIG. 4B is a schematic diagram of generating a forwarding entry according to an embodiment of the present disclosure. The forwarding entry generated in FIG. 4B is obtained based on the route sending process in FIG. 4A. As shown in FIG. 4B, an address of a network device 1 is 1.1.1.1, in other words, a destination address of a route 1 sent by the network device 1 to a network device 2 is 1.1.1.1. After the network device 2 determines slice information corresponding to a port 1 that receives the route 1, the network device 2 may generate a forwarding entry 1 corresponding to the destination address 1.1.1.1. A destination address that is included in the forwarding entry 1 is 1.1.1.1, an outbound interface is the port 1, and slice information corresponding to the outbound interface is a slice identifier 1, a slice identifier 2, and a slice identifier 3.

Similarly, after a network device 3 receives, through a port 2, a route 2 sent by the network device 2, the network device 3 may determine slice information corresponding to the port 2, and generate a forwarding entry 2. A destination address included in the forwarding entry 2 is 1.1.1.1, an outbound interface is the port 2, and slice information corresponding to the outbound interface is the slice identifier 2 and the slice identifier 3.

After a network device 4 receives, through a port 3, a route 3 sent by the network device 3, the network device 4 may determine slice information corresponding to the port 3, and generate a forwarding entry 3. A destination address included in the forwarding entry 3 is 1.1.1.1, an outbound interface is the port 3, and slice information corresponding to the outbound interface is the slice identifier 3.

The foregoing embodiments describe a process in which after receiving a route, a network device determines slice information corresponding to a receive port and forwards the route. The following describes a process in which a network device receives a route and determines that a receive port does not have corresponding slice information.

Figure 5:
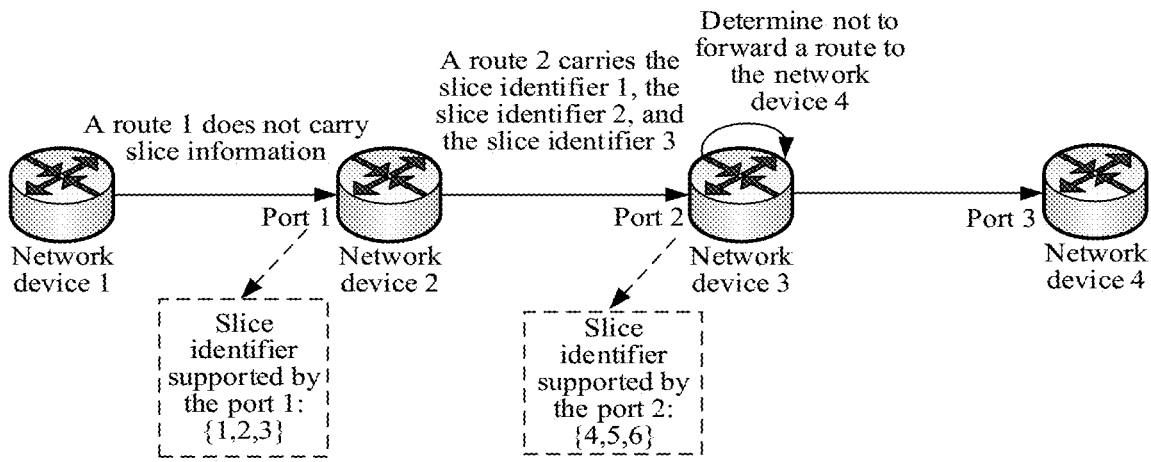
FIG. 5 is a schematic flowchart of another route sending according to an embodiment of the present disclosure.

FIG. 5 is a schematic flowchart of another route sending according to an embodiment of the present disclosure. In FIG. 5, similar to the embodiment corresponding to FIG. 4A, a network device 1 sends a route 1 that does not carry slice information to a network device 2. The network device 2 sends a route 2 that carries a slice identifier 1, a slice identifier 2, and a slice identifier 3 to a network device 3.

The network device 3 receives the route 2 through a port 2, and slice information supported by the port 2 is a slice identifier 4, a slice identifier 5, and a slice identifier 6. When the network device 3 determines, based on the slice information carried by the route 2 and the slice information supported by the port 2, slice information corresponding to the port 2, that there is no intersection between the slice information carried by the route 2 and the slice information supported by the port 2 may be found. In other words, the port 2 does not have corresponding slice information. In this case, the network device 3 determines to terminate forwarding of the route 2. In other words, the network device 3 does not forward the route 2 to a network device 4. In addition, the network device 3 does not generate a forwarding entry related to the route 2.

In addition, in some other possible cases, the network device 3 may update the route 2 to obtain an updated route 2, where the updated route 2 does not carry slice information. Then, the network device 3 forwards the updated route 2 to the network device 4. In other words, in actual application, a route forwarding policy may be determined according to a network planning requirement. After the network device receives a route that carries slice information, if a port receiving the route does not support the slice information carried by the route, the network device may not forward the route, or may forward the route after removing the slice information in the route. This is not specifically limited in this embodiment.

The foregoing embodiment describes a process in which after receiving a route, a network device determines slice information corresponding to a receive port and forwards the route. The following describes a process how a network device determines slice information corresponding to a receive port and forwards a route, after receiving a plurality of routes with a same destination address.

Figure 6:
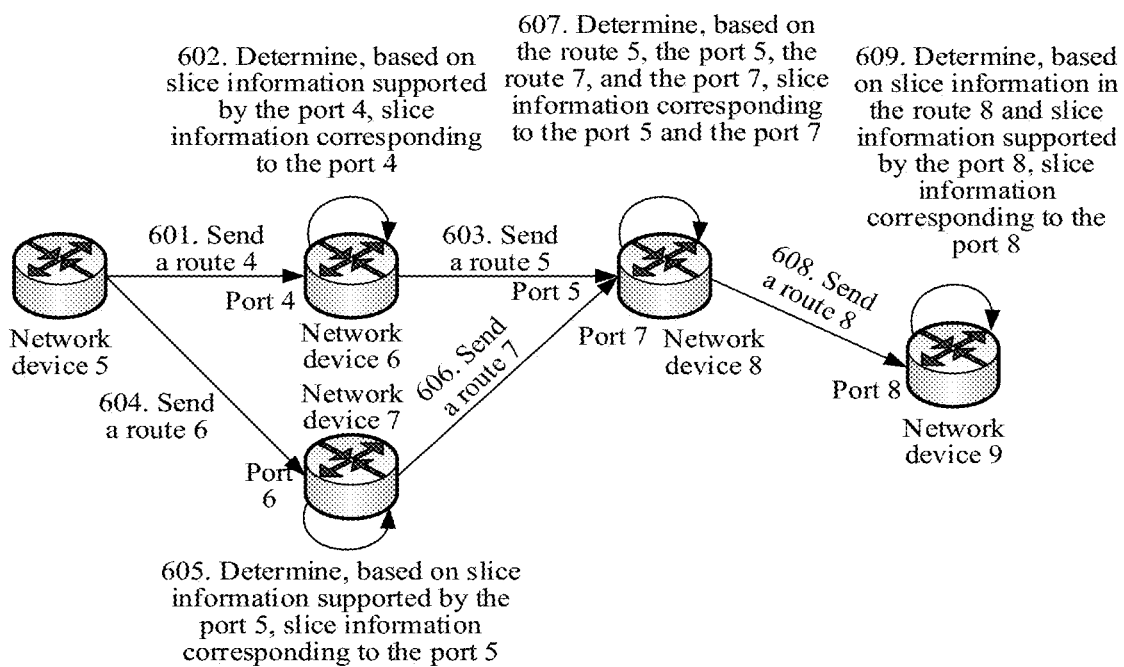
FIG. 6 is a schematic flowchart of another route processing according to an embodiment of the present disclosure.

FIG. 6 is a schematic flowchart of another route processing according to an embodiment of the present disclosure. A route processing method shown in FIG. 6 includes the following step 601 to step 609.

Step 601: A network device 5 sends a route 4 to a network device 6, where the route 4 does not carry slice information.

A destination address of the route 4 may be an address of the network device 5. For example, the destination address of the route 4 is 5.5.5.5.

Step 602: The network device 6 determines, based on slice information supported by a port 4, slice information corresponding to the port 4, where the port 4 is a port that is on the network device 6 and that receives the route 4.

Step 603: The network device 6 sends a route 5 to a network device 8, where the route carries the slice information corresponding to the port 4.

In this embodiment, steps 601 to 603 are similar to the foregoing steps 201 to 203. For details, refer to the foregoing steps 201 to 203. The details are not described herein again.

Figure 7A:
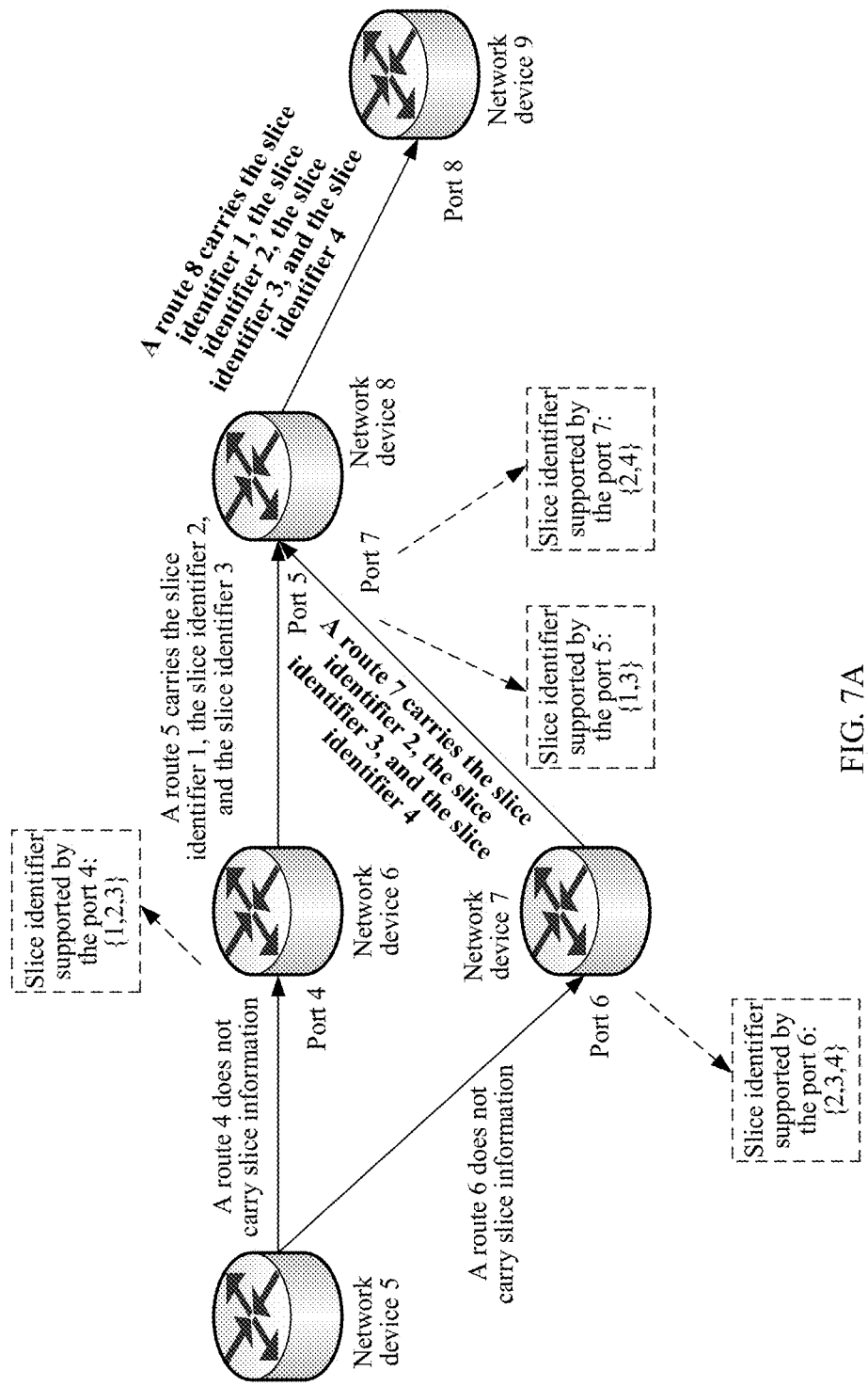
FIG. 7A is a schematic flowchart of another route sending according to an embodiment of the present disclosure.

For example, refer to FIG. 7A. FIG. 7A is a schematic flowchart of another route sending according to an embodiment of the present disclosure. The route sending process shown in FIG. 7A corresponds to FIG. 6. As shown in FIG. 7A, slice information supported by a port 4 may be a slice identifier 1, a slice identifier 2, and a slice identifier 3. In other words, slice information carried by a route 5 is the slice identifier 1, the slice identifier 2, and the slice identifier 3.

Figure 7B:
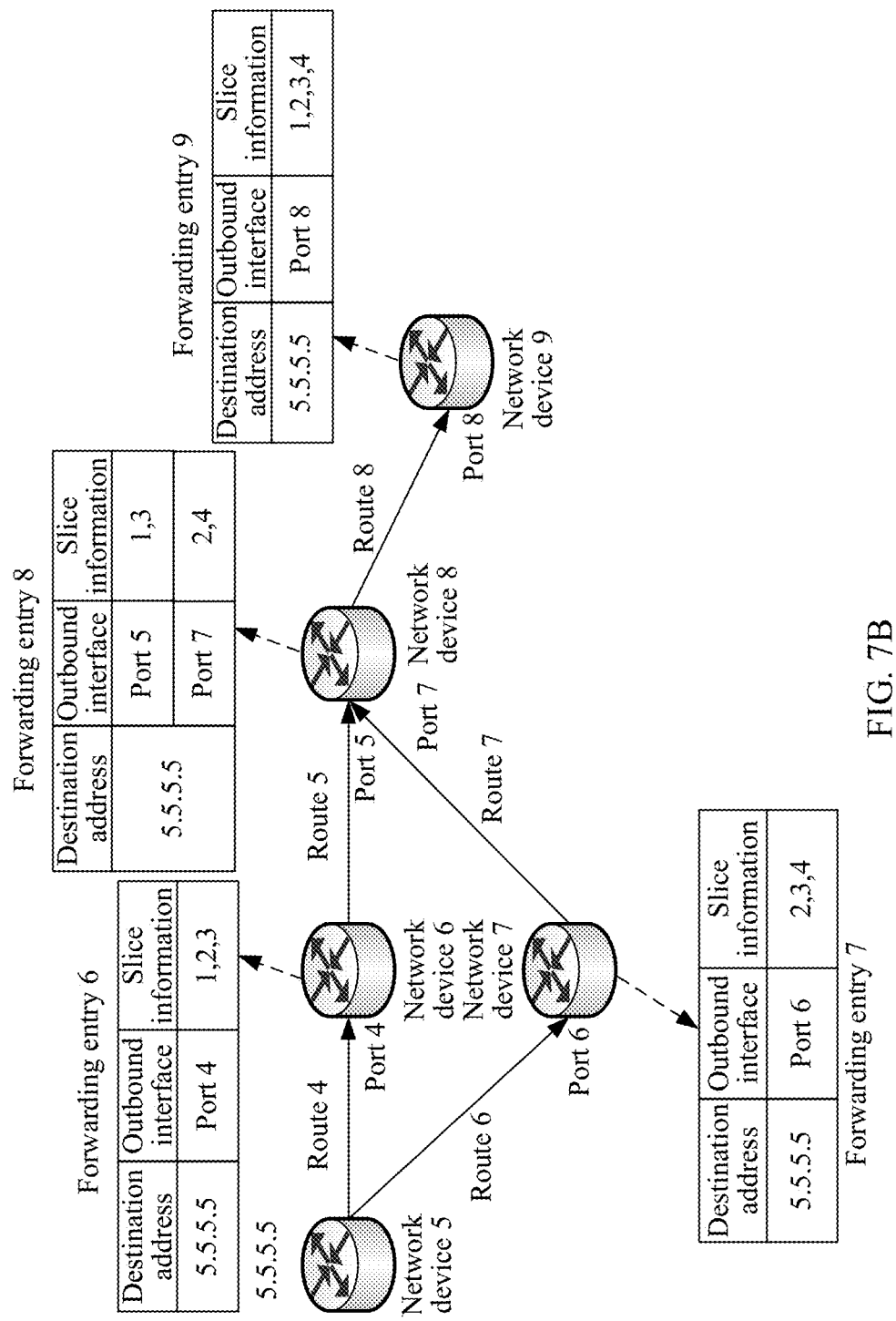
FIG. 7B is a schematic diagram of another generation of a forwarding entry according to an embodiment of the present disclosure.

FIG. 7B is a schematic diagram of another generation of a forwarding entry according to an embodiment of the present disclosure. As shown in FIG. 7B, an address of a network device is 5.5.5.5. In other words, a destination address of a route 4 sent by the network device 5 to a network device 6 is 5.5.5.5. After the network device 6 determines slice information corresponding to a port 4 that receives the route 4, the network device 6 may generate a forwarding entry 6 corresponding to the destination address 5.5.5.5. A destination address included in the forwarding entry 6 is 5.5.5.5, an outbound interface is the port 4, and slice information corresponding to the outbound interface is a slice identifier 1, a slice identifier 2, and a slice identifier 3.

Step 604: The network device 5 sends a route 6 to a network device 7, where the route 6 does not carry slice information.

A destination address of the route 6 may be the address of the network device 5. For example, the destination address of the route 6 is 5.5.5.5.

Step 605: The network device 7 determines, based on slice information supported by a port 6, slice information corresponding to the port 6, where the port 6 is a port that is on the network device 7 and that receives the route 6.

Step 606: The network device 7 sends a route 7 to the network device 8, where the route 7 carries the slice information corresponding to the port 6.

In this embodiment, steps 604 to 606 are also similar to the foregoing steps 201 to 203. For details, refer to the foregoing steps 201 to 203. The details are not described herein again.

For example, as shown in FIG. 7A, the slice information supported by the port 6 may be the slice identifier 2, the slice identifier 3, and the slice identifier 4. In other words, the slice information carried by the route 7 is the slice identifier 2, the slice identifier 3, and the slice identifier 4.

For example, as shown in FIG. 7B, after the network device 7 receives, through the port 6, the route 6 sent by the network device 5, the network device 7 may determine the slice information corresponding to the port 6, and generate a forwarding entry 7. A destination address included in the forwarding entry 7 is 5.5.5.5, an outbound interface is the port 6, and slice information corresponding to the outbound interface is the slice identifier 2, the slice identifier 3, and the slice identifier 3.

Step 607: The network device 8 determines, based on the route 5, a port 5, the route 7, and a port 7, slice information corresponding to the port 5 and the port 7.

In this embodiment, after the network device 8 receives the route 5 and the route 7 that have a same destination address, the network device 8 may determine corresponding slice information based on the route 5, the route 7, and ports that receive the two routes.

Specifically, the network device 8 may determine, based on the slice information carried by each route of the route 5 and the route 7 and slice information supported by ports (to be specific, the port 5 and the port 7) corresponding to each route of the route 5 and the route 7, slice information corresponding to each port of the port 5 and the port 7. In other words, the network device 8 may first determine slice information corresponding to each port that receives a route. Then, the network device 8 determines, based on the slice information corresponding to each port of a plurality of ports, slice information corresponding to the plurality of ports. The plurality of ports are ports that receive routes with a same destination address, to be specific, the port 5 and the port 7. The slice information corresponding to the plurality of ports includes the slice information corresponding to each port of the plurality of ports. The slice information corresponding to the plurality of ports may also be referred to as slice information corresponding to the destination address in the routes received by the plurality of ports, to be specific, slice information supported by a path from the network device 8 to the destination address in the routes received by the plurality of ports.

For example, because the slice information carried by the route 5 is the slice identifier 1, the slice identifier 2, and the slice identifier 3, and the slice information supported by the port 5 that receives the route 5 is the slice identifier 1 and the slice identifier 3, the slice information corresponding to the port 5 may be determined as the slice identifier 1 and the slice identifier 3. Similarly, because the slice information carried by the route 7 is the slice identifier 2, the slice identifier 3, and the slice identifier 4, and the slice information supported by the port 7 that receives the route 7 is the slice identifier 2 and the slice identifier 4, the slice information corresponding to the port 7 may be determined as the slice identifier 2 and the slice identifier 4. Finally, a union set between the slice information corresponding to the port 5 and the slice information of the port 7 is obtained through computation, so that it can be determined that the slice information corresponding to the port 5 and the port 7 is the slice identifier 1, the slice identifier 2, the slice identifier 3, and the slice identifier 4.

In this embodiment, the plurality of routes received by the network device 8 all carry slice information. In some other possible embodiments, a part of the plurality of routes received by the network device 8 may carry slice information, and the other part does not carry the slice information. For example, a direct link is established between the network device 8 and the network device 5. The network device 8 may receive a route that is sent by the network device 5 and that does not carry slice information. The network device 8 may further receive routes that carry slice information and that are sent by the network device 6 and the network device 7. Similarly, when the network device 8 receives a route that does not carry slice information and that is sent by the network device 5, the network device may determine slice information corresponding to a port that receives the route, and calculate a union set of the slice information corresponding to the port, the slice information corresponding to the port 5, and the slice information corresponding to the port 7, to determine slice information corresponding to the address of the network device 5.

It may be understood that, in actual application, a network device may first receive one of routes, and then receive another route with a same destination address after long time. In this case, the network device may determine slice information corresponding to a port that first receives the route. Then the network device sends a route to a neighboring device based on the slice information corresponding to the port. Then, after receiving the another route, the network device determines, based on the two routes and corresponding ports, slice information corresponding to the two ports, and sends a new route to the neighboring device. The new route carries the slice information corresponding to the two ports.

For example, when the network device 8 first receives the route 5, the network device 8 may determine the slice information corresponding to the port 5, and sends a route that carries the slice information corresponding to the port 5 to a network device 9. Then, after the network device 8 receives the route 7, the network device 8 determines, based on the route 5, the port 5, the route 7, and the port 7, the slice information corresponding to the port 5 and the port 7, and sends a route that carries the slice information corresponding to the port 5 and the port 7 to the network device 9.

For example, as shown in FIG. 7B, after the network device 8 receives, through the port 5, the route 5 sent by the network device 6, and receives, through the port 7, the route 7 sent by the network device 7, the network device 8 may determine the slice information corresponding to the port 5 and the port 7, and generate a forwarding entry 8. A destination address included in the forwarding entry 8 is 5.5.5.5, outbound interfaces are the port 5 and the port 7, the slice information corresponding to the port 5 that is in the outbound interfaces is the slice identifier 1 and the slice identifier 3, and the slice information corresponding to the port 7 is the slice identifier 3 and the slice identifier 3.

Step 608: The network device 8 sends a route 8 to the network device 9.

In this embodiment, the network device 8 may generate the route 8 based on the route 5 and the route 7, and send the route 8 to the network device 9. A destination address of the route 8 is the address of the network device 5, and the route 8 carries the slice information corresponding to the port 5 and the port 7.

Step 609: The network device 9 determines, based on the slice information in the route 8 and slice information supported by a port 8, slice information corresponding to the port 8, where the port 8 is a port that is on the network device 9 and that receives the route 8.

When the network device 8 sends the route 8 to the network device 9, the network device 9 receives the route 8 through the port 8. The slice information corresponding to the port 8 is slice information supported by a corresponding path from the port 8 to the destination address in the route 8.

Similarly, because the route 8 carries the slice information, the network device 9 may determine, based on the slice information in the route 8 and the slice information supported by the port 8, the slice information corresponding to the port 8.

For example, it is assumed that the slice information supported by the port 8 is specifically the slice identifier 1 and the slice identifier 4, and the slice information in the route 3 is specifically the slice identifier 1, the slice identifier 2, the slice identifier 3, and the slice identifier 4. In this case, the network device 9 may determine that the slice information corresponding to the port 8 is slice information that is included in both the slice information supported by the port 8 and the slice information in the route 8, to be specific, the slice identifier 1 and the slice identifier 4.

The route processing method provided in embodiments is described above. For ease of understanding, the following describes a process of route advertisement and packet forwarding in detail with reference to specific examples.

Figure 8A:
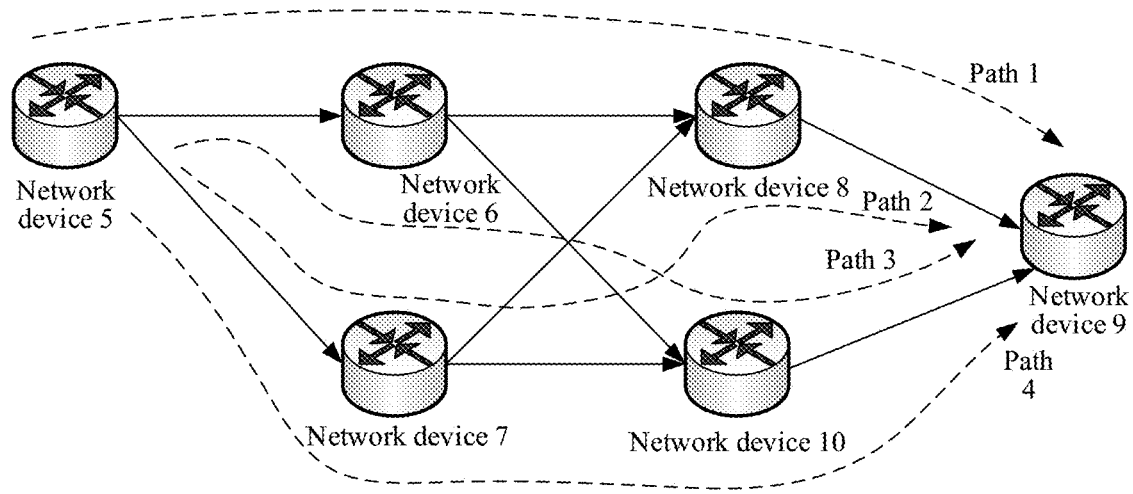
FIG. 8A is a schematic diagram of a route advertisement path according to an embodiment of the present disclosure.

FIG. 8A is a schematic diagram of a route advertisement path according to an embodiment of the present disclosure. As shown in FIG. 8A, a network device 5 is separately connected to a network device 6 and a network device 7. The network device 6 is separately connected to a network device 8 and a network device 10. The network device 7 is separately connected to the network device 8 and the network device 10. Both of the network device 8 and the network device 10 are connected to a network device 9.

There are four paths for advertising routes from the network device 5 to the network device 9, which are respectively a path 1, a path 2, a path 3, and a path 4.

Network devices that the path 1 passes through are specifically: the network device 5>the network device 6>the network device 8>the network device 9.

Network devices that the path 2 passes through are specifically: the network device 5>the network device 7>the network device 8>the network device 9.

Network devices that the path 3 passes through are specifically: the network device 5>the network device 6>the network device 10>the network device 9.

Network devices that the path 4 passes through are specifically: the network device 5>the network device 7>the network device 10>the network device 9.

Slice information supported by a port that is on a network device is shown in Table 1.

TABLE 1

| Port | Supported slice identifier |
|---|---|
| Port 4 | {1, 2, 3} |
| Port 5 | {1, 3, 4} |
| Port 6 | {2, 3, 4} |
| Port 7 | {1, 2, 4} |
| Port 8 | {1, 2, 3, 4} |
| Port 9 | {1, 2} |
| Port 10 | {2, 3} |
| Port 11 | {1, 2, 3} |

A service level agreement (Service Level Agreement, SLA) capability of a service indicated by a slice is shown in Table 2:

TABLE 2

| Slice | Supported service SLA capability |
| --- | --- |
| Slice 1 | Default |
| Slice 2 | Low latency |
| Slice 3 | High reliability |
| Slice 4 | High bandwidth |

Figure 8B:
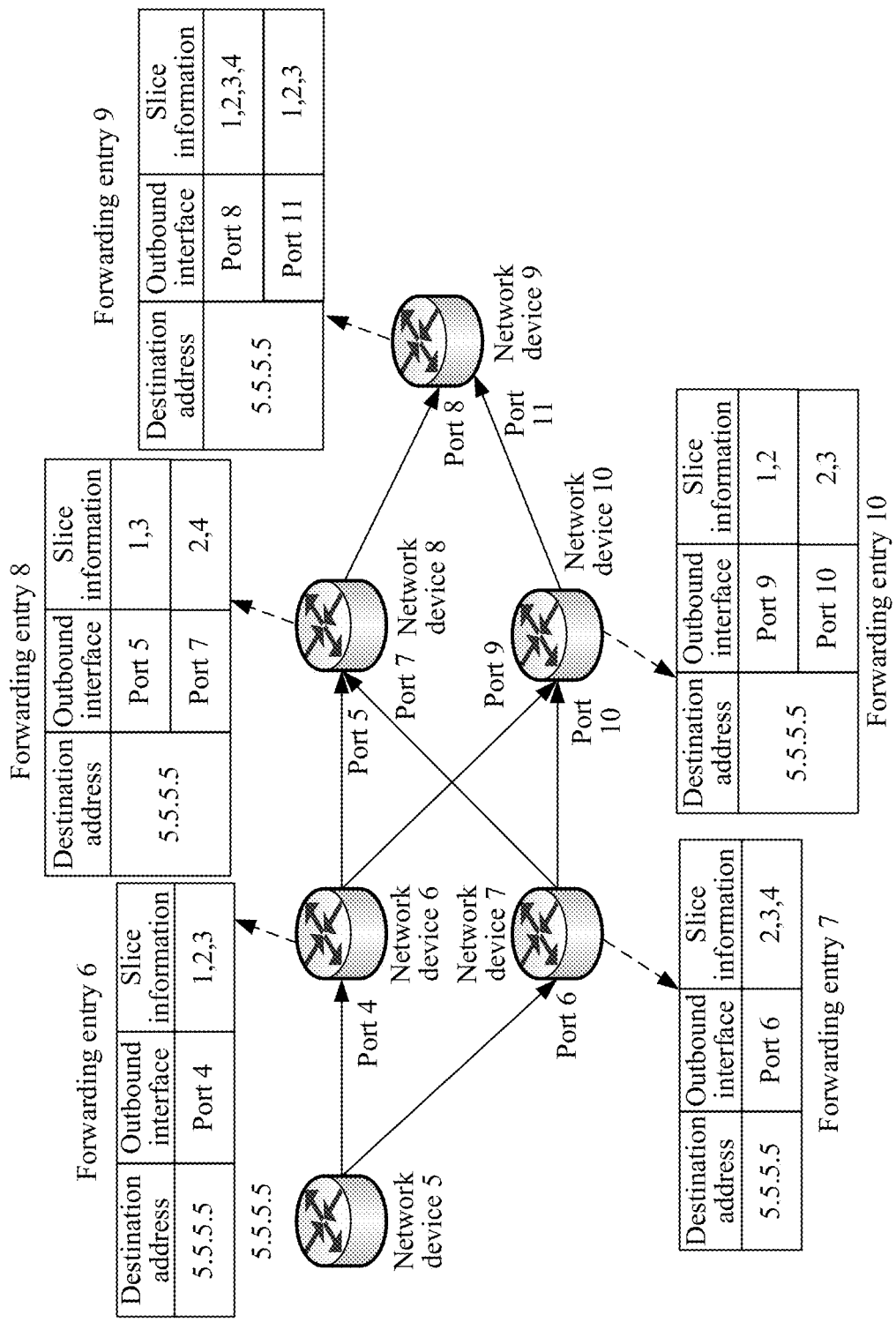
FIG. 8B is a schematic diagram of generating a forwarding entry according to an embodiment of the present disclosure.

Based on the foregoing plurality of route advertisement paths and the slice information supported by the port in Table 1, forwarding entries generated on the network device 6 to the network device 10 may be obtained. FIG. 8B is a schematic diagram of generating a forwarding entry according to an embodiment of the present disclosure. As shown in FIG. 8B, each of the network device 6 to the network device 10 generates a corresponding forwarding entry, and these forwarding entries are for guiding subsequent packet forwarding.

After the route advertisement is completed, each network device may forward a subsequent packet based on the forwarding entry that is generated.

The network device 9 is used as an example. After the network device receives a packet whose destination address is 5.5.5.5, the network device 9 searches the forwarding entry based on the destination address of the packet. Outbound interfaces obtained by searching include the port 8 and the port 11.

When slice information carried by the packet is the slice identifier 1, the slice identifier 2, or the slice identifier 3, the network device 9 may select one of the port 8 and the port 11 to send the packet. For example, load splitting is formed between the port and the port 11, and the network device 9 selects, according to a load balancing policy, one of the port 8 and the port 11 to send the packet.

When the slice information carried by the packet is the slice identifier 4, the network device 9 determines, based on the slice identifier 4, to send the packet through the port 8. In other words, when the network device 9 obtains a plurality of matched outbound interfaces by searching the forwarding entry, the network device 9 may select, based on the slice information carried by the packet, an outbound interface that has corresponding slice information.

Figure 9:
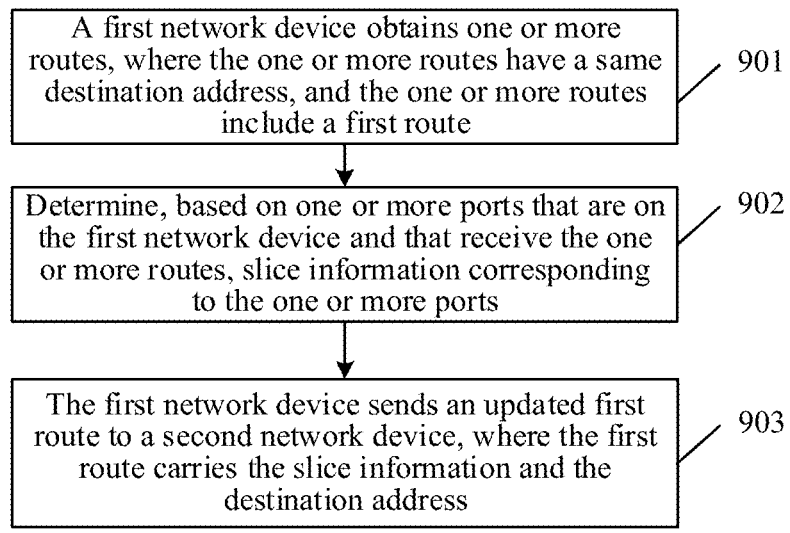
FIG. 9 is a schematic flowchart of a route processing method according to an embodiment of the present disclosure.

According to the foregoing embodiments, an embodiment of the present disclosure further provides a route processing method. FIG. 9 is a schematic flowchart of a route processing method according to an embodiment of the present disclosure. As shown in FIG. 9, the route processing method provided in this embodiment of the present disclosure includes at least the following steps 901 to 903.

901: A first network device obtains one or more routes, where the one or more routes have a same destination address, and the one or more routes include a first route.

In this embodiment, the first network device and a second network device may each be, for example, a physical device such as a router, a switch, or a gateway, or may be a virtual device that supports routing and packet forwarding. The first network device may obtain the one or more routes by receiving routes sent by one or more neighboring devices. The one or more routes have a same destination address. In other words, the one or more routes have a same route originator.

For example, the first network device may be the network device 2 or the network device 3 in FIG. 2. The first network device may alternatively be, for example, the network device 6, the network device 7, or the network device 8 in FIG. 6.

902: The first network device determines, based on one or more ports that are on the first network device and that receive the one or more routes, slice information corresponding to the one or more ports.

In this embodiment, the slice information corresponding to the one or more ports may be slice information supported by a path from the first network device to the destination address in the route received by the one or more ports.

For example, that the first network device determines the slice information corresponding to the one or more ports may be the foregoing step 202, step 204, step 602, step 605, or step 607.

903: The first network device sends an updated first route to the second network device, where the first route carries the slice information and the destination address.

After the first network device determines the slice information corresponding to the one or more ports, the first network device may update the first route based on the slice information corresponding to the one or more ports to obtain the updated first route, and the updated first route carries the slice information corresponding to the one or more ports and the destination address.

In a possible implementation, the determining, based on one or more ports that are on the first network device and that receive the one or more routes, slice information corresponding to the one or more ports includes: obtaining slice information respectively supported by the one or more ports that are on the first network device and that receive the one or more routes; and determining, based on the slice information respectively supported by the one or more ports, the slice information corresponding to the one or more ports.

For example, the one or more ports may be ports that support configuration of the slice information, such as FlexEth interfaces or channelized sub-interfaces. The one or more ports can be configured to support specific slice information. The first network device may determine, based on the slice information respectively supported by the one or more ports, the slice information corresponding to the one or more ports, to determine the slice information supported by the path from the network device to the rout starting device.

In a possible implementation, the one or more routes all carry the slice information; and the determining, based on the slice information respectively supported by the one or more ports, the slice information corresponding to the one or more ports includes: determining, based on slice information carried by the one or more routes and the slice information respectively supported by the one or more ports, the slice information corresponding to the one or more ports; where there is a correspondence between the slice information corresponding to the one or more ports and the destination address of the one or more routes.

In other words, the first network device may determine, based on both the slice information carried by the one or more routes and the slice information respectively supported by the one or more ports, the slice information corresponding to the one or more ports.

For example, when the one or more routes all carry slice information, a step that the first network device determines the slice information corresponding to the one or more ports may be the foregoing step 203 or step 607.

In a possible implementation, the determining, based on slice information carried by the one or more routes and the slice information respectively supported by the one or more ports, the slice information corresponding to the one or more ports includes: determining, based on slice information carried by each of the one or more routes and slice information supported by a port corresponding to each route, slice information corresponding to each of the one or more ports; and determining, based on the slice information corresponding to each of the one or more ports, the slice information corresponding to the one or more ports, where the slice information corresponding to the one or more ports includes the slice information corresponding to each port.

Simply, the first network device may determine, based on slice information supported by each port and slice information in a route received by each port, the slice information corresponding to each port, and then determine slice information corresponding to a plurality of ports by calculating a union set of slice information corresponding to each of the plurality of ports. In this way, it can be ensured that the slice information corresponding to the plurality of ports is the slice information supported by the path from the first network device to the routing starting device from the network device. For example, a step that the first network device determines the slice information corresponding to the one or more ports may be the foregoing step 607.

In a possible implementation, the determining, based on slice information carried by each of the one or more routes and slice information supported by a port corresponding to each route, slice information corresponding to each of the one or more ports includes: obtaining first slice information and second slice information, where the first slice information is slice information carried by any one of the one or more routes, and the second slice information is slice information supported by a first port corresponding to a route that carries the first slice information; and determining that same slice information in the first slice information and the second slice information is third slice information, where the third slice information is slice information corresponding to the first port.

For example, a step that the first network device determines the third slice information may be the foregoing step 607. For example, it is assumed that slice information carried by a route is a slice identifier 1, a slice identifier 2, and a slice identifier 3 (that is, the first slice information), and slice information supported by a port that receives the route is the slice identifier 1 and the slice identifier 3 (that is, the second slice information). In this case, slice information corresponding to the port may be determined as the slice identifier 1 and the slice identifier 3 (that is, the third slice information).

In a possible implementation, none of the one or more routes carries slice information, and the determining, based on the slice information respectively supported by the one or more ports, the slice information corresponding to the one or more ports includes: determining, based on slice information supported by each of the one or more ports, the slice information corresponding to the one or more ports, where the slice information corresponding to the one or more ports includes the slice information supported by each port.

For example, when none of the one or more routes carries the slice information, a step that the first network device determines the slice information corresponding to the one or more ports may be the foregoing step 202, step 602, or step 605.

In a possible implementation, the method further includes: The first network device receives a second route, where the second route includes fourth slice information; the first network device obtains slice information supported by a port that receives the second route; and the first network device determines, based on that there is no same slice information between the fourth slice information and the slice information supported by the port that receives the second route, not to forward the second route. In other words, when slice information carried by a route received by the network device does not intersect with slice information supported by a port that receives the route, the network device determines not to forward the route and does not generate a forwarding entry corresponding to the route, to avoid that a packet service requirement cannot be met in a subsequent packet forwarding process because a forwarding port does not support specific slice information.

In a possible implementation, the method further includes: The first network device receives a first packet, where the first packet includes fifth slice information; the first network device searches a forwarding table based on a destination address in the first packet, to obtain at least one port corresponding to the first packet; and the first network determines, based on the fifth slice information from the at least one port, a port for forwarding the first packet, where slice information supported by the port for forwarding the first packet includes slice information in the packet.

In other words, in a packet forwarding process, when the network device obtains one or more matched outbound interfaces by searching the forwarding entry, the network device may select, based on slice information carried by a packet, an outbound interface that has corresponding slice information.

In a possible implementation, the first network device receives one or more border gateway protocol BGP messages. Each of the one or more BGP messages includes one of the one or more routes, and an extended community attribute of each BGP message includes slice information of one of the one or more routes. The extended community attribute in the one or more BGP messages includes the slice information.

For example, when a network device 2 sends a route 2 to a network device 3 by using a BGP message, the BGP message sent by the network device 2 may include one or more routes. The one or more routes are routes advertised by the network device 2 to the network device 3, and the one or more routes include the foregoing route 2. The BGP message further includes an extended community attribute corresponding to the route 2, and the extended community attribute carries slice information of the route 2, in other words, slice information corresponding to a port 1 in the foregoing network device 2.

In a possible implementation, the first network device is a network device in a campus network, a data center network, or a software-defined wide area network.

The foregoing embodiments use the example in which the first network device is a network device in the campus network to describe the scenarios to which the route processing method provided in embodiments of the present disclosure is applied. It may be understood that the route processing method provided in embodiments of the present disclosure may also be applied to another network scenario. A network scenario to which embodiments of the present disclosure is applied is not uniquely limited herein.

Figure 10:
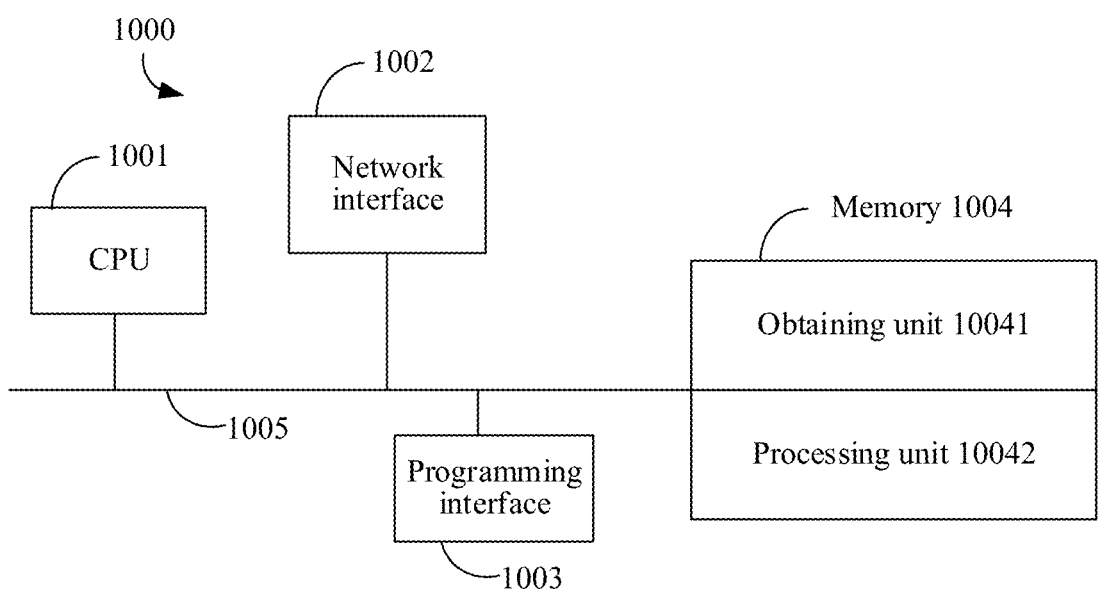
FIG. 10 is a schematic diagram of a structure of a network device 1000 according to an embodiment of the present disclosure.

To implement the foregoing embodiments, the present disclosure further provides a network device. FIG. 10 is a schematic diagram of a structure of a network device 1000 according to an embodiment of the present disclosure.

Although the network device 1000 shown in FIG. 10 shows some specific features, a person skilled in the art may be aware from embodiments of the present disclosure that, for brevity, FIG. 10 does not show various other features, to avoid confusing more related aspects of the implementations disclosed in embodiments of the present disclosure. For this purpose, as an example, in some implementations, the network device 1000 includes one or more processing units (CPUs) 1001, a network interface 1002, a programming interface 1003, a memory 1004, and one or more communication buses 1005 that are configured to interconnect various components. In some other implementations, some function components or units may be omitted or added to the network device 1000 based on the foregoing example.

In some implementations, in addition to another purpose, the network interface 1002 is configured to be connected to one or more other network devices/servers in a network system. In some implementations, the communication bus 1005 includes a circuit that performs interconnection and controls communication between system components. The memory 1004 may include a non-volatile memory, for example, a read-only memory (ROM), a programmable ROM (PROM), an erasable PROM (EPROM), an electrically EPROM (EEPROM), or a flash memory. The memory 1004 may also include a volatile memory. The volatile memory may be a random-access memory (RAM), and is used as an external cache.

In some implementations, a non-transitory computer-readable storage medium of the memory 1004 or the memory 1004 stores the following programs, modules, and data structures, or a subset thereof, and for example, includes a transceiver unit (not shown in the figure), an obtaining unit 10041, and a processing unit 10042.

In a possible embodiment, the network device 1000 may have any function of the network device 2 in the method embodiment corresponding to FIG. 2.

It may be understood that the network device 1000 may correspond to the first network device in the foregoing method embodiment. Modules, and the foregoing other operations and/or functions in the network device 1000 are separately used to implement various steps and methods implemented by the first network device in the method embodiment. For details, refer to the method embodiment corresponding to FIG. 2. For brevity, details are not described herein again.

It should be understood that the foregoing function of the transceiver unit may be implemented by the processor by invoking program code in the memory, and cooperation with the network interface 1002 is performed when necessary. Alternatively, a data receiving/sending operation may be completed by the network interface 1002 on the network device 1000.

In various implementations, the network device 1000 is configured to perform the route processing method provided in embodiments of the present disclosure, for example, perform the route processing method corresponding to the embodiment shown in FIG. 2.

In correspondence to the method embodiments and the virtual apparatus embodiments provided in the present disclosure, an embodiment of the present disclosure further provides a network device. The following describes a hardware structure of the network device.

Figure 11:
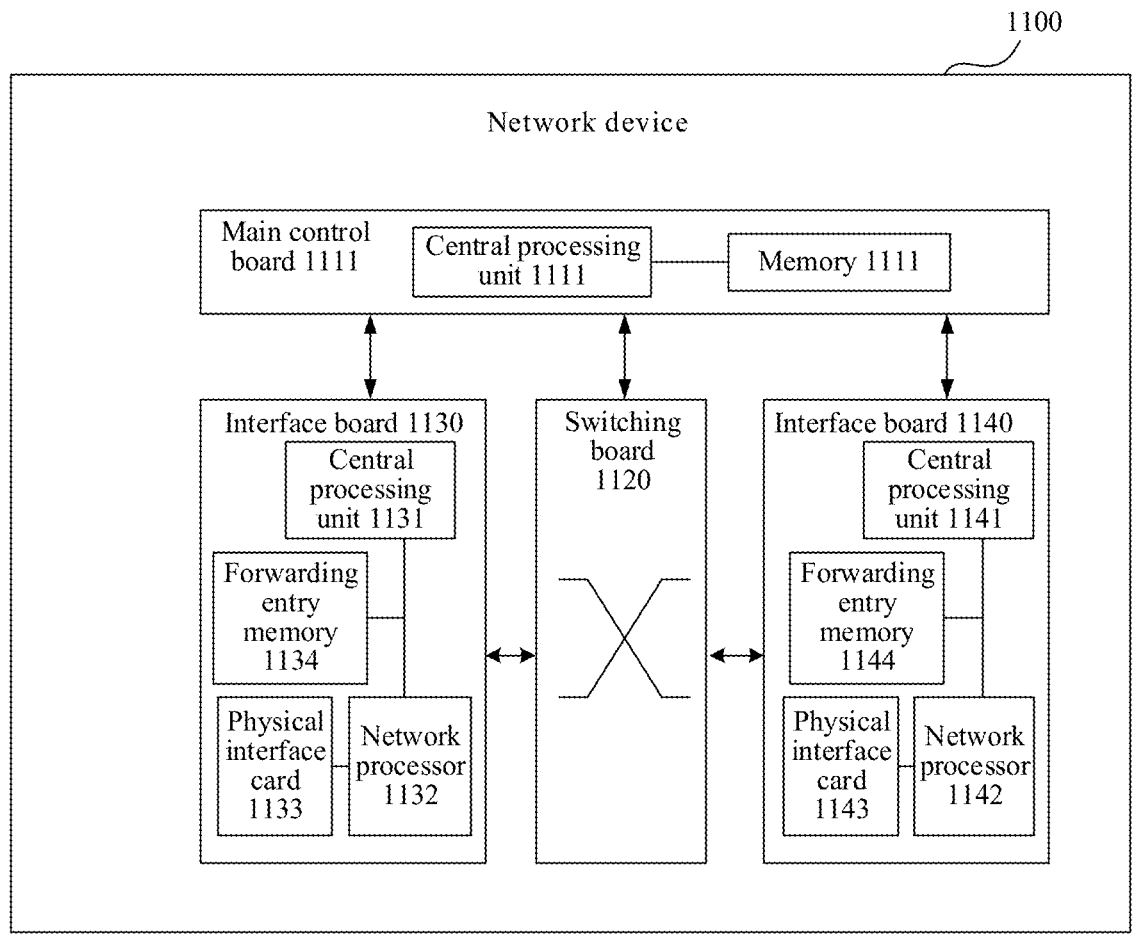
FIG. 11 is a schematic diagram of a structure of a network device 1100 according to an embodiment of the present disclosure.

FIG. 11 is a schematic diagram of a structure of a network device 1100 according to an embodiment of the present disclosure. The network device 1100 may be configured as the first network device in the foregoing method embodiments.

The network device 1100 may correspond to the first network device in the foregoing method embodiments. Hardware and modules in the network device 1100 and the foregoing other operations and/or functions are separately used to implement various steps and methods implemented by the first network device in the method embodiments. For specific details of a detailed procedure about how the network device 1100 forwards a packet, refer to the foregoing method embodiments. For brevity, details are not described herein again. The steps of the method embodiment corresponding to FIG. 2 can be implemented by using a hardware integrated logic circuit in a processor in the network device 1100, or by using an instruction in a form of software. Steps of the method disclosed with reference to embodiments of the present disclosure may be directly performed by a hardware processor, or may be performed by using a combination of hardware in the processor and a software module. A software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

The network device 1100 may also correspond to the network device 1100 in the foregoing virtual apparatus embodiment, and each functional module in the network device 1100 is implemented by using software and hardware of the network device 1100. In a possible implementation, the functional modules included in the network device 1100 are generated after the processor of the network device 1100 reads program code stored in the memory, or are implemented by the processor of the network device 1100 by reading program code stored in the memory and cooperating with a communication interface.

The network device 1100 includes a main control board 1111 and an interface board 1130.

The main control board 1111 is also referred to as a main processing unit (MPU) or a route processor card. The main control board 1111 controls and manages components in the network device 1100, including functions such as routing calculation, device management, device maintenance, and protocol processing. The main control board 1111 includes a central processing unit 1111 and a memory 1111.

The interface board 1130 is also referred to as a line processing unit (LPU), a line card, or a service board. The interface board 1130 is configured to: provide various service interfaces, and forward a data packet. The service interfaces include but are not limited to an Ethernet interface, a Packet over Synchronous Optical Networking (SONET)/Synchronous Digital Hierarchy (SDH) (POS) interface, and the like. The Ethernet interface is, for example, a FlexE service interface. The interface board 1130 includes a central processing unit 1131, a network processor 1132, a forwarding entry memory 1134, and a physical interface card (PIC) 1133.

The central processing unit 1131 on the interface board 1130 is configured to: control and manage the interface board 1130, and communicate with the central processing unit 1111 on the main control board 1111.

The network processor 1132 is configured to implement packet forwarding processing. A form of the network processor 1132 may be a forwarding chip. Specifically, processing on an uplink packet includes processing at a packet ingress interface and forwarding table lookup, and processing on a downlink packet includes forwarding table lookup and the like.

The physical interface card 1133 is configured to implement a physical layer interconnection function. Original traffic enters the interface board 1130 from the physical interface card, and a processed packet is sent from the physical interface card 1133. The physical interface card 1133 includes at least one physical interface, and the physical interface is also referred to as a physical port. The physical interface card 1133 corresponds to a FlexE physical interface in a system architecture. The physical interface card 1133, also referred to as a subcard, may be installed on the interface board 1130, and is responsible for converting an optical/electrical signal into a packet, performing validity check on the packet, and forwarding the packet to the network processor 1132 for processing. In some embodiments, the central processing unit 1131 of the interface board 1103 may alternatively perform a function of the network processor 1132, for example, implement software forwarding based on a general-purpose CPU. Therefore, the network processor 1132 is not necessary in the physical interface card 1133.

Optionally, the network device 1100 includes a plurality of interface boards. For example, the network device 1100 further includes an interface board 1140. The interface board 1140 includes a central processing unit 1141, a network processor 1142, a forwarding entry memory 1144, and a physical interface card 1143.

Optionally, the network device 1100 further includes a switching board 1120. The switching board 1120 may also be referred to as a switch fabric unit (SFU). When the network device has a plurality of interface boards 1130, the switching board 1120 is configured to complete data exchange between the interface boards. For example, the interface board 1130 and the interface board 1140 may communicate with each other by using the switching board 1120.

The main control board 1111 is coupled to the interface board 1130. For example, the main control board 1111, the interface board 1130 and the interface board 1140, and the switching board 1120 are connected to a system backboard by using a system bus for interworking. In a possible implementation, an inter-process communication (IPC) channel is established between the main control board 1111 and the interface board 1130, and the main control board 1111 and the interface board 1130 communicate with each other through the IPC channel.

Logically, the network device 1100 includes a control plane and a forwarding plane. The control plane includes the main control board 1111 and the central processing unit 1131. The forwarding plane includes components used for forwarding, such as the forwarding entry memory 1134, the physical interface card 1133, and the network processor 1132. The control plane performs functions such as routing, generating a forwarding table, processing signaling and a protocol packet, and configuring and maintaining a device status. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

It should be understood that a transceiver unit in the network device 1100 may be equivalent to the physical interface card 1133 or the physical interface card 1143 in the network device 1100, and an obtaining unit 11041 and a processing unit 11042 in the network device 1100 may be equivalent to the central processing unit 1111 or the central processing unit 1131 in the network device 1100.

It can be understood that operations performed on the interface board 1140 are consistent with operations performed on the interface board 1130 in this embodiment of the present disclosure. For brevity, details are not described again. It should be understood that the network device 1100 in this embodiment may correspond to the first network device in the foregoing method embodiments. The main control board 1111, the interface board 1130, and/or the interface board 1140 in the network device 1100 may implement functions and/or various steps performed by the first network device in the foregoing method embodiments. For brevity, details are not described herein again.

It should be noted that, there may be one or more main control boards. When there is a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there is a plurality of switching boards, load splitting and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained by combining the two central processing units. The device in this form (for example, a network device such as a low-end switch or router) has a weak data exchange and processing capability. A specific architecture that is to be used depends on a specific networking deployment scenario, and is not uniquely limited herein.

In some possible embodiments, the first network device may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as a first network device. For example, the first network device may be implemented based on a general-purpose physical server in combination with a network functions virtualization (NFV) technology. The first network device is a virtual host, a virtual router, or a virtual switch. After reading the present disclosure, with reference to the NFV technology, a person skilled in the art may virtualize, on the general-purpose physical server, the first network devices having the foregoing functions. Details are not described herein.

It should be understood that the network devices in the foregoing product forms separately have any function of the first network device in the foregoing method embodiments, and details are not described herein.

An embodiment of the present disclosure provides a computer program product. When the computer program product runs on a network device, the network device is enabled to perform the method performed by the network device 2 in the method embodiment corresponding to FIG. 2.

Figure 12:
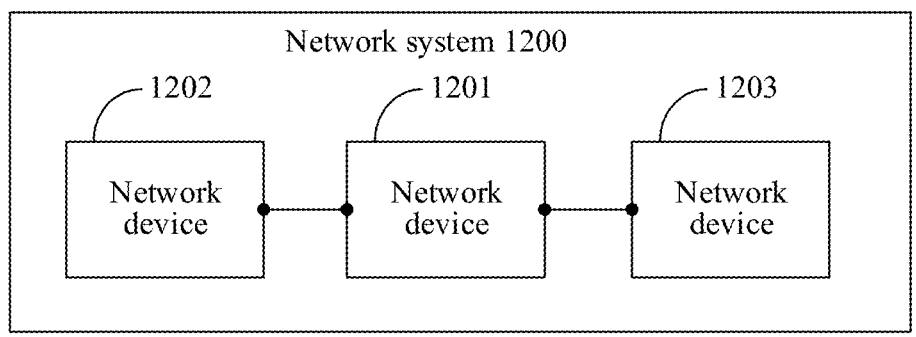
FIG. 12 is a schematic diagram of a structure of a network system 1200 according to an embodiment of the present disclosure.

Refer to FIG. 12. An embodiment of the present disclosure provides a network system 1200. The system 1200 includes a network device 1201, a network device 1202, and a network device 1203. The network device 1201 is separately connected to the network device 1202 and the network device 1203. Optionally, the network device 1201 may be the first network device in the method embodiment corresponding to FIG. 2.

An embodiment of the present disclosure further provides a chip, including a processor and an interface circuit. The interface circuit is configured to receive instructions and transmit the instructions to the processor. The processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in the present disclosure. For example, the memory may be a non-transitory processor, for example, a ROM. The memory and the processor may be integrated into a same chip, or may be separately disposed on different chips. A type of the memory and a manner of disposing the memory and the processor are not specifically limited in the present disclosure.

For example, the chip system may be a field-programmable gate array (FPGA), an application-specific integrated circuit (ASIC), a system on a chip (SoC), a central processing unit (CPU), a network processor (NP), a digital signal processor (DSP), a microcontroller unit (MCU), a programmable logic device (PLD), or another integrated chip.

The foregoing describes embodiments of the present disclosure in detail. Steps in the methods in embodiments of the present disclosure may be sequentially scheduled, combined, or deleted according to an actual requirement. Modules in the apparatus in embodiments of the present disclosure may be divided, combined, or deleted according to an actual requirement.

It should be understood that "one embodiment" or "an embodiment" mentioned in the entire specification means that particular features, structures, or characteristics related to the embodiment are included in at least one embodiment of the present disclosure. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of embodiments of the present disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of the present disclosure, "B corresponding to A" represents that B is associated with A, or B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the field that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, each functional unit in embodiments of the present disclosure may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the current technology, or all or some of the technical solutions may be implemented in a form of a software product. The computer software product is stored in a storage medium and includes several instructions for instructing a computer device (which may be a personal computer, a server, a network device/server, or the like) to perform all or some of the steps of the methods in embodiments of the present disclosure. The foregoing storage medium includes any medium that can store program code, such as a Universal Serial Bus (USB) flash drive, a portable hard disk, a ROM, a RAM, a magnetic disk, or an optical disc.

What is claimed is:

1. A route processing method, implemented by a first network device, the route processing method comprising:
   receiving, by one or more ports of the first network device, one or more routes having a first destination address, wherein the first destination address is the same for the one or more routes;
   determining, based on the one or more ports, first slice information corresponding to the one or more ports;
   updating a first route of the one or more routes to obtain an updated first route, wherein the updated first route carries the first slice information and the first destination address; and
   sending the updated first route to a second network device.

2. The route processing method of claim 1, wherein determining the first slice information comprises:
   obtaining second slice information respectively supported by the one or more ports; and
   determining, based on the second slice information, the first slice information.

3. The route processing method of claim 2, wherein the one or more routes all carry third slice information, wherein determining the first slice information comprises determining, based on third slice information and the second slice information, the first slice information, and wherein there is a correspondence between the first slice information and the first destination address.

4. The route processing method of claim 3, wherein determining the first slice information comprises:
   determining, based on fourth slice information carried by each of the one or more routes and fifth slice information supported by a first port corresponding to each route, sixth slice information corresponding to each of the one or more ports; and
   determining, based on the sixth slice information, the first slice information, wherein the first slice information comprises the sixth slice information.

5. The route processing method of claim 4, wherein determining the sixth slice information comprises:
   obtaining seventh slice information and eighth slice information, wherein the seventh slice information is carried by any one of the one or more routes, and wherein the eighth slice information is supported by a second port corresponding to a second route that carries the seventh slice information; and
   determining that the seventh slice information and the eighth slice information both comprise ninth slice information, wherein the ninth slice information corresponds to the second port.

6. The route processing method of claim 2, wherein none of the one or more routes carries third slice information, wherein determining, based on the second slice information, the first slice information comprises determining, based on the second slice information, the first slice information, and wherein the first slice information comprises the second slice information.

7. The route processing method of claim 6, wherein the method further comprises:
   receiving a second route comprising fourth slice information;
   obtaining fifth slice information supported by a first port that receives the second route; and
   determining, when the fourth slice information and the fifth slice information share no common slice information, not to forward the second route.

8. The route processing method of claim 7, wherein the method further comprises:
   receiving a first packet comprising sixth slice information;
   searching a forwarding table based on a second destination address in the first packet to obtain at least one port corresponding to the first packet; and
   determining, based on the sixth slice information, a second port for forwarding the first packet, wherein seventh slice information supported by the second port comprises the sixth slice information.

9. The route processing method of claim 8, further comprising receiving one or more Border Gateway Protocol (BGP) messages, wherein each of the one or more BGP messages comprises one of the one or more routes, and wherein an extended community attribute of each BGP message comprises ninth slice information of one of the one or more routes.

10. The route processing method of claim 9, wherein the first network device is in a campus network, a data center network, or a software-defined wide area network (SD-WAN).

11. A network device comprising:
    one or more ports configured to receive one or more routes comprising a first destination address, wherein the first destination address is the same for the one or more routes;
    a memory configured to store instructions; and
    one or more processors coupled to the one or more ports and the memory and configured to execute the instructions to:
      determine, based on the one or more ports, first slice information corresponding to the one or more ports;
      update a first route of the one or more routes to obtain an updated first route, wherein the updated first route carries the first slice information and the first destination address; and
      send the updated first route to a second network device.

12. The network device of claim 11, wherein the one or more processors are further configured to execute the instructions to:
    obtain second slice information respectively supported by the one or more ports; and
    determine, based on the second slice information, the first slice information.

13. The network device of claim 12, wherein the one or more routes all carry third slice information, and wherein the one or more processors are further configured to execute the instructions to:
- determine, based on third slice information and the second slice information, the first slice information, wherein there is a correspondence between the first slice information and the first destination address.

14. The network device of claim 13, wherein the one or more processors are further configured to execute the instructions to:
- determine, based on fourth slice information carried by each of the one or more routes and fifth slice information supported by a first port corresponding to each route, sixth slice information corresponding to each of the one or more ports; and
- determine, based on the sixth slice information, the first slice information, wherein the first slice information comprises the sixth slice information.

15. The network device of claim 14, wherein the one or more processors are further configured to execute the instructions to:
- obtain seventh slice information carried by any one of the one or more routes;
- obtain eighth slice information supported by a second port corresponding to a second route that carries the seventh slice information; and
- determine that same slice information in the seventh slice information and the eighth slice information is ninth slice information corresponding to the second port.

16. The network device of claim 12, wherein none of the one or more routes carries third slice information, and wherein the one or more processors are further configured to execute the instructions to:
- determine, based on the second slice information, the first slice information, wherein the first slice information comprises the second slice information.

17. The network device of claim 16, wherein the one or more processors are further configured to execute the instructions to:
- receive a second route comprising fourth slice information;
- obtain fifth slice information supported by a first port that receives the second route; and
- determine, based on that there is no same slice information between the fourth slice information and the fifth slice information, not to forward the second route.

18. The network device of claim 17, wherein the one or more processors are further configured to execute the instructions to:
- receive a first packet comprising sixth slice information;
- search a forwarding table based on a second destination address in the first packet to obtain at least one port corresponding to the first packet; and
- determine, based on the sixth slice information, a second port for forwarding the first packet, wherein seventh slice information supported by the second port comprises the sixth slice information.

19. The network device of claim 18, wherein the one or more processors are further configured to execute the instructions to:
- receive one or more border gateway protocol (BGP) messages, wherein each of the one or more BGP messages comprises one of the one or more routes, and wherein an extended community attribute of each BGP message comprises ninth slice information of one of the one or more routes.

20. A computer program product stored on a non-transitory computer storage medium that when executed by one or more processors of a network device, cause the network device to:
- receive, by one or more ports of the network device, one or more routes comprising a destination address, wherein the destination address is the same for the one or more routes;
- determine, based on the one or more ports, first slice information corresponding to the one or more ports;
- update a first route of the one or more routes to obtain an updated first route, wherein the updated first route carries the first slice information and the destination address; and
- send the updated first route to a second network device.

* * * * *